(12) United States Patent
Paturu

(10) Patent No.: US 10,871,055 B2
(45) Date of Patent: *Dec. 22, 2020

(54) SUBSEA LEVEL DIVERSION OF A GAS ENTRAINMENT WITH INCORPORATED EMERGENCY MEASURES UPON A WELL BLOW OUT

(71) Applicant: Sumathi Paturu, Birmingham, AL (US)

(72) Inventor: Sumathi Paturu, Birmingham, AL (US)

(73) Assignee: Paturu Sumathi, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/932,078

(22) Filed: Jan. 30, 2018

(65) Prior Publication Data

US 2019/0234185 A1   Aug. 1, 2019

(51) Int. Cl.
*E21B 43/01* (2006.01)
*E21B 43/36* (2006.01)

(52) U.S. Cl.
CPC .......... *E21B 43/0122* (2013.01); *E21B 43/36* (2013.01)

(58) Field of Classification Search
CPC ............................. E21B 43/0122; E21B 43/36
See application file for complete search history.

(56) References Cited

U.S. PATENT DOCUMENTS

| | | | | |
|---|---|---|---|---|
| 1,830,061 A | * | 11/1931 | Howe | E21B 35/00 166/364 |
| 3,666,100 A | * | 5/1972 | Madej | E21B 43/0122 210/800 |
| 3,681,923 A | * | 8/1972 | Hyde | E21B 43/0122 405/60 |
| 4,309,127 A | * | 1/1982 | Jacobs | E21B 43/0122 210/923 |
| 4,531,860 A | * | 7/1985 | Barnett | E21B 43/0122 210/923 |
| 5,191,940 A | * | 3/1993 | Alonso | B01D 19/0042 166/79.1 |
| 5,213,444 A | * | 5/1993 | Henning | B01D 17/00 405/63 |
| 6,004,385 A | * | 12/1999 | Birmingham | B01D 19/0057 96/174 |
| 9,175,549 B2 | | 11/2015 | Paturu | |
| 9,879,517 B2 | * | 1/2018 | Paturu | E21B 43/36 |

* cited by examiner

*Primary Examiner* — James G Sayre

(57) ABSTRACT

A Subsea Diversion of a pressured Gas Entrainment from the riser pipe, by a 'Gas Entrainment Diversion Tubing' (GDT) prevents rig-fire upon a well blow-out, wherein the giant bubbles emerging from water and rising to the atmospheric air are neither 'pressured' nor 'explosive', however precluded to enter the air-gap. A 'Sea Level Gas Separator of Oil Well Effluent' (SLGOE) unit working in conjunction instantly separates gas from the down-flowing oil-gas effluent, whereas the unit's voluminous top outlets for gas are subject to attenuating the pressured elements (volume and pressure being inversely related). Another model of SLGOE unit diverts pressured gaseous elements into oceanic waters, obviating an explosive gas-fire by its oxygen-free 'milieu'. Upon a breach to the drilling conductor, an 'oil-separator' tank isolates oil from oceanic waters, while precluding oceanic waters entering the oil-containment, the latter, otherwise a brewing danger of mounting pressure culminating into a spewing geyser.

9 Claims, 7 Drawing Sheets

Figure 1:
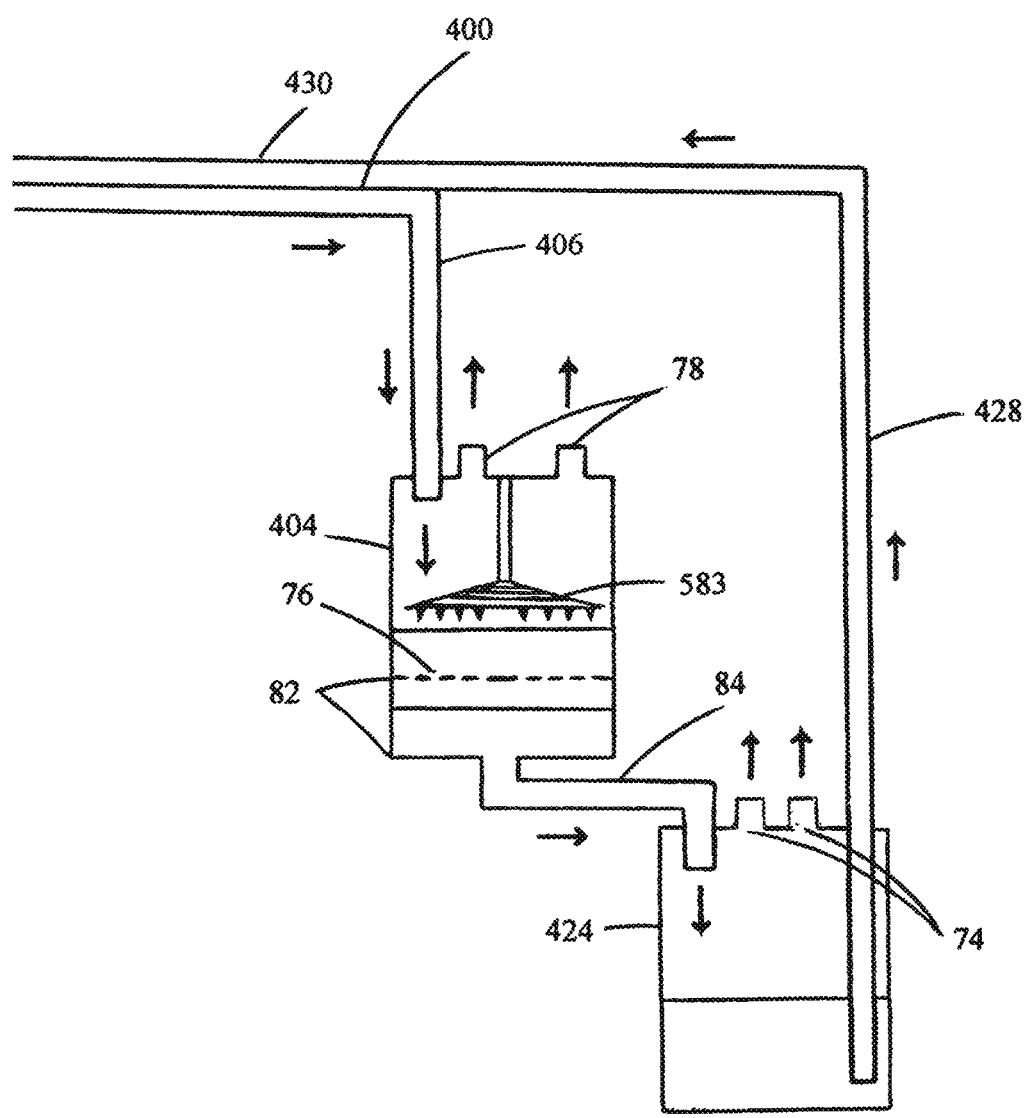

SUBSEA LEVEL DIVERSION OF A GAS ENTRAINMENT WITH INCORPORATED EMERGENCY MEASURES UPON A WELL BLOW OUT

CROSS-REFERENCE TO RELATED APPLICATIONS

U.S. Pat. No. 9,175,549 Title: Emergency Salvage of a Crumbled Oceanic oil well Filing Date Jun. 6, 2011 U.S. Pat. No. 9,879,517 Title: Subsea Level Gas Separator of Crude Petroleum Oil Filing Date Nov. 3, 2015

STATEMENT REGARDING FEDERALLY SPONSORED RESEARCH

Not Federally Sponsored (No Joint Research Agreement)

SEQUENCE LISTING OF PROGRAMS

NA

This is a Continuation-in-part (CIP) application of U.S. Pat. No. 9,879,517 titled as 'SUBSEA LEVEL GAS SEPARATOR OF CRUDE PETROLEUM OIL' which was a CIP of U.S. Pat. No. 9,175,549.

BACK GROUND OF THE INVENTION

There are innumerable petroleum oil wells bored into the oceanic floor by highly evolved modern devices to tap the petroleum (crude oil) reservoirs. Many oil wells are clustered in oceanic grounds, often of significant distance from the coast line, such wells bored through the ocean floor as deep as ⅛th of a mile from the surface waters, to find their way into the underground oil containments spread many miles in area. Oil is collected into surface tanks in moderate containers, or into receptacles as large as ships.

Historically, the production of petroleum from the earth's mantle in the ocean floor has shrouded risk and great hazard to the natural environment that includes both the marine life forms and the terrestrial ecosystem adjacent. The greatest hazard is the entrainment and ignition of the highly inflammable gases like Methane, causing dangerous fires, coupled with the risk of oil spewing and polluting the ocean waters. Such two man-made calamities at the same time can be uncontrollable with available resources, and devastating to the healthy existence of the earth's planetary life forms. For these reasons, error-proof safety systems in under water bore well digging, and highly trained personnel involved in their operations, are required by law in all countries engaged in significant oil production. Despite such stringent laws, system failures and catastrophic results did occur historically, and are still occurring, though the derived remedial measures through the 'adverse event experiences', each uniquely different from the other in some form or other, are still nascent, and less than perfect. The recent event in the Gulf Shores of Mexico, involving BP Oil Company's oil well under construction (the Macondo Prospect oil well of the Deep Water Horizon), wherein the ignition of the entrained Methane gas and its fire that continued unstopped for 36 hours, had culminated in a collapse of the surface structure of the well, resulting in an ever increasing gusher from the source. Several different attempts by the BP Oil company's technological team to contain the spewing geyser from finding its way into the body of water and into the gulf shores had failed, mostly due to the inherently limited robotic attempts involved in a moderately deep aquatic habitat.

As any unforeseen adversity can happen at any time before the completion of the well to its last functional detail, safety measures to weather off any event at any step of the construction, have to be in place, before beginning to undertake such operation. This CIP application enumerating a model of 'Subsea Level Diversion of a Gas Entrainment with Incorporated Emergency Measures upon a Well Blow Out' includes means and method steps to be incorporated for dissipating a giant gas entrainment. There are plurality of measures otherwise operative, described in the original application (U.S. Pat. No. 9,175,549) by the Inventor Applicant, and can be consulted, said measures working in synchrony to weather off unforeseen events about the well construction. The original application is also a parent application for yet another CIP application (filed May 25, 2017) titled 'Emergency Fire Escape Devices of the Off-Shore Rigs with Emphasis on a Detachable Island Rig', a subject matter of great significance for being both preventive and remedial in scope, of otherwise catastrophic and totally devastating consequences of a rig-fire.

Many unforeseen adversities are inherent to ventures such as the deep sea explorations and the like, shrouded in mystery and counting on the tides of nature yet to be conquered by the evolving technological sophistication. Accordingly, the Inventor is neither legally liable nor personally responsible for any inadvertent errors and/or 'adverse' events, difficult to differentiate either as a mere association or as a consequence of the application of the structural/procedural information herein enumerated. Application of this disclosure in different situations is a personal choice. Furthermore, analyzing and adapting swiftly as needed to diverse situations remain as the professional discretion and the deemed responsibility of the company involved in the day to day practice of implementing this invention, in part or as a whole.

BRIEF DESCRIPTION OF THE INVENTION

The present invention is drawn to a model of 'Subsea Level Diversion of a Gas Entrainment with Incorporated Emergency Measures upon a Well Blow out'. It is designed to divert the pressured components of gas nearly to a total extent, a highly inflammable gas entrainment/gaseous elements thereby precluded from finding way into a rig, historically a known venue of danger. The devised system in addition endeavors to prevent a blowout, presumably in conjunction with the proposed revising mechanics (in the event an uncontainable gas entrainment is encountered) of the globally employed conventional Blow-out-preventer (BOP). Yet, in the event of a blow out, the gas entrainment is being diverted away to a safe distance under water, by the device of a 'Gas Entrainment Diversion Tubing' (GDT) working in conjunction with a device of 'Sea Level Gas Separator of Oil Well Effluent' (SLGOE) unit. Said SLGOE unit prototype is configured as two separate entities, geared to different events/situations. The oceanic 'Gas Entrainment Diversion Tubing' (GDT) and the SLGOE unit(s) are inseparably combined, as it conforms to a better utilitarian model. Additionally, the invention encompasses a device of an 'Oil Separator of the Water Admixed Effluent' that includes measures to circumvent the events following a structural damage to the well head and its vicinity including the damage to the outermost barrier of drilling conductor upon a well blow out, thereby precluding pollution of the ecosystem, as also preventing the oil containment brewing into a spewing geyser being otherwise filled with the oceanic waters. In a simpler designing of the plan, the SLGOE unit is configured as a single entity positioned in the rig or in a place adjacent, the unit requisitioned also for the oceanic diversion of the pressured gaseous elements, wherein the passage of the latter is effectuated through a safe oxygen-free milieu of the unit, such function being required of, outside the functioning of the afore specified 'Gas Entrainment Diversion Tubing' (GDT). There is substantial flexibility of options for the oil company to choose from, the latter also guided by future cumulative experiences.

The Gas Entrainment Diversion scheme is incorporated into the system at a time a well's blow out starts to emerge as a threat, that is, as the drilling of the down hole is reaching its completion, and is amenable for a 'kick' from the oil containment. The riser and the conductor, about the bottom strings, as close to the well head as feasible, as also about additional string levels, are devised to incorporate large 'Gas Entrainment Diversion Tubing' (GDT) originating from the riser pipe, to be opening into the ocean, so as a giant gas entrainment is diverted into the ocean waters. In addition, what is incidentally accomplished, is, the rising gas bubbles emerged into the oceanic waters and rising to the surface are neither pressured nor explosive, the pressured giant entrainment being dwarfed in an open (and infinite) body of oceanic containment The two separate entities of the SLGOE prototypes as specified in the foregoing, are noted and briefly outlined below—

1) Emergency Operational SLGOE (EOS) unit, and
2) Routine and Emergency Operational SLGOE unit, that is, a Multi-operational SLGOE (MOS) unit.

1) Emergency Operational SLGOE (EOS) unit—the EOS model is located in the vicinity of the rig, and is made operational upon a well blow out, wherein after the oceanic 'let out' of the 'gas entrainment' by the GDT, the oil-gas mixture flowing into the riser pipe is led into the EOS unit, for the separation of the attenuated oil-gas mixture, and diversion to designed destinations.

2) Routine and Emergency Operational SLGOE unit, that is, a Multi-operational SLGOE (MOS) unit—the MOS model is functional at all times, following the installation of the production tubing as an oil conduit. On a regular basis the oil collection system reaching the rig is directed to the MOS unit, also located in the rig vicinity, and oil returned to the rig after its gaseous elements are separated. In the same token, when there is a blow-out, the effluent reaching the rig site through the oil collection system (though the latter is breached about the well-head, either minimally or in a major proportion) also by-passes the rig, to return after the gaseous elements, either pressured or not, are separated by the MOS unit. Most of the times, as a pressured entrainment reaches the MOS unit about predictable times, it can be successfully schemed for an oceanic diversion without an explosive rig fire.

The invention further provides a model of tubing, directed to all the tubular systems about the rig, the well, and the vicinity, facilitating instant joining or closing of a broken system following a catastrophic event.

DRAWINGS

FIG. 1: 'A Model Depicting the Flow Principles of Separating the Components of Gas from the Liquid and Semisolid Crude of Petroleum Analogs.' The Figure also illustrates an incorporated dispersion-device to disrupt the semisolid effluent blocking the flow from a gas separator tank.

Figure 2:
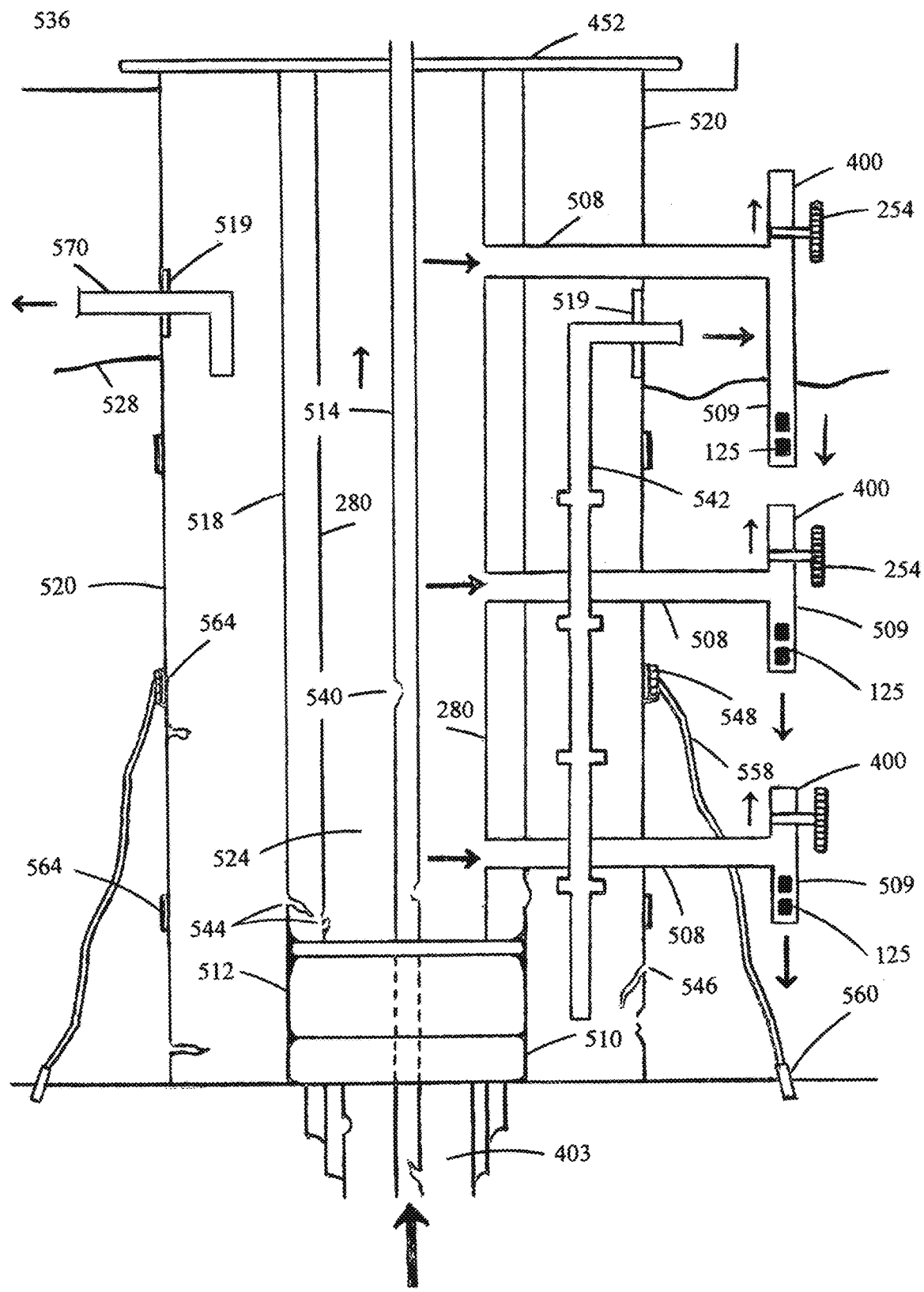

FIG. 2: The drawing illustrates—(a) 'A Schematic of Oceanic Diversion of a Gas Entrainment from within a Riser pipe through a Gas Entrainment Diversion Tubing'; (b) 'A Schematic of Effluent Diversion from within the riser pipe to an Emergency Operational Sea Level Gas Separator of Oil Well Effluent Unit'; (c) 'A Schematic of diversion of Blown out Well Effluent with Admixed Ocean waters' from within the conductor space, consequent to a breach of a drilling conductor.

Figure 3:
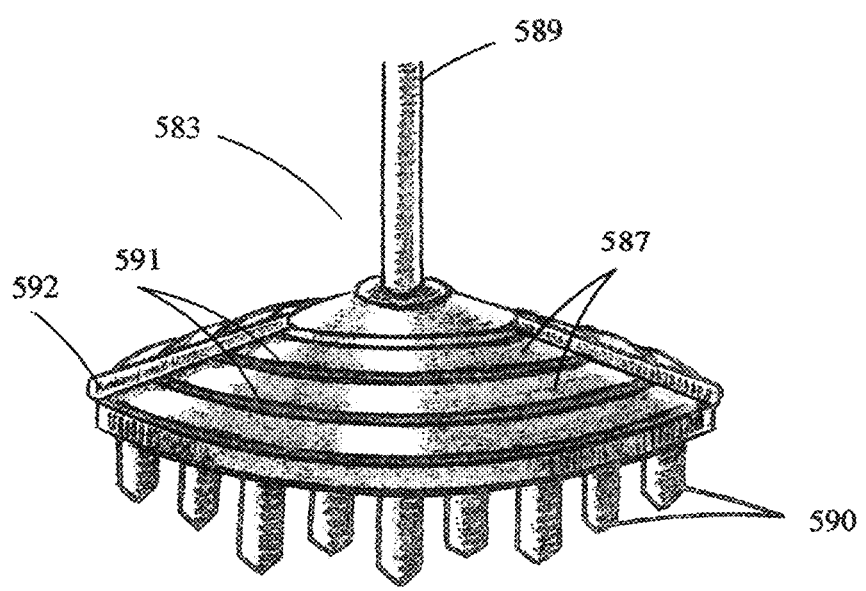

FIG. 3: The drawing illustrates 'A Perspective View of a Spiked Circle Dispersion Device'-a model to be incorporated in a gas separator tank of a 'Sea Level Gas Separator of Oil Well Effluent' unit, said device configured to disrupt the semisolid effluent blocking the out-flow from a gas separator tank.

Figure 4:
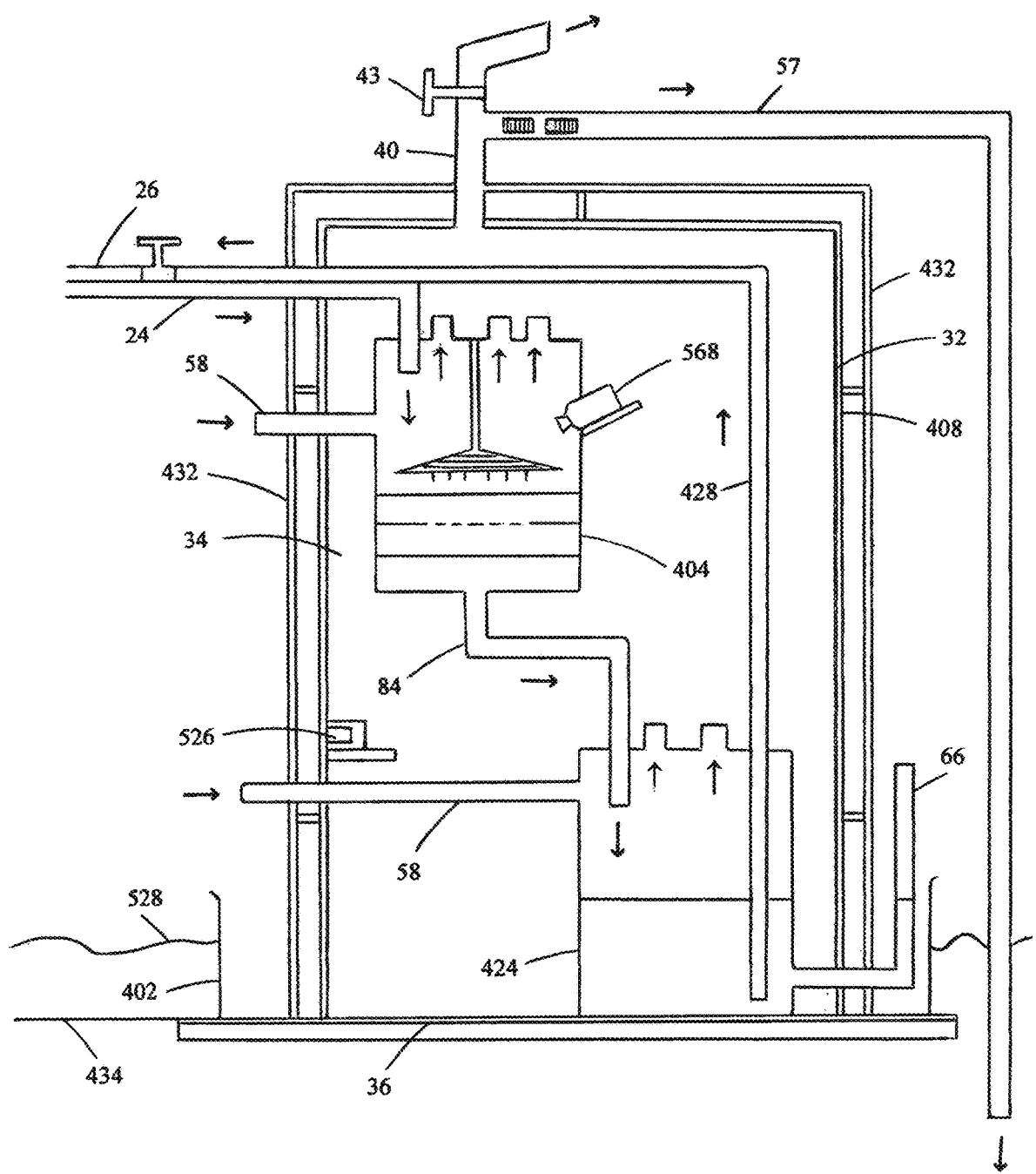

FIG. 4: The drawing illustrates 'The Additional Structural Measures Required of a MOS unit for the scheme of Oceanic Diversion of the Gas Entrainment'.

Figure 5:
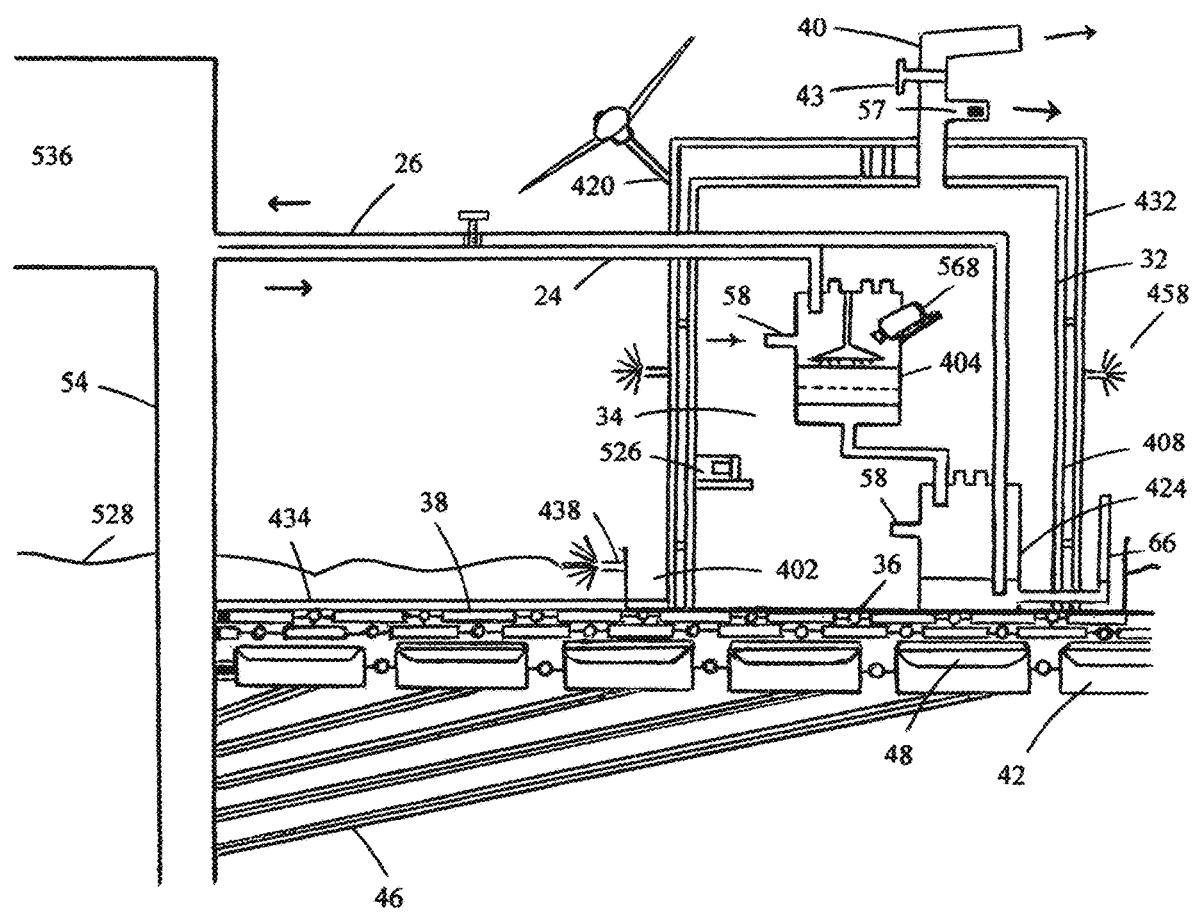

FIG. 5: The drawing illustrates 'A Schematic of the Positional Disposition of a Sea Level Gas Separator of Oil Well Effluent unit' about the rig site.

Figure 6:
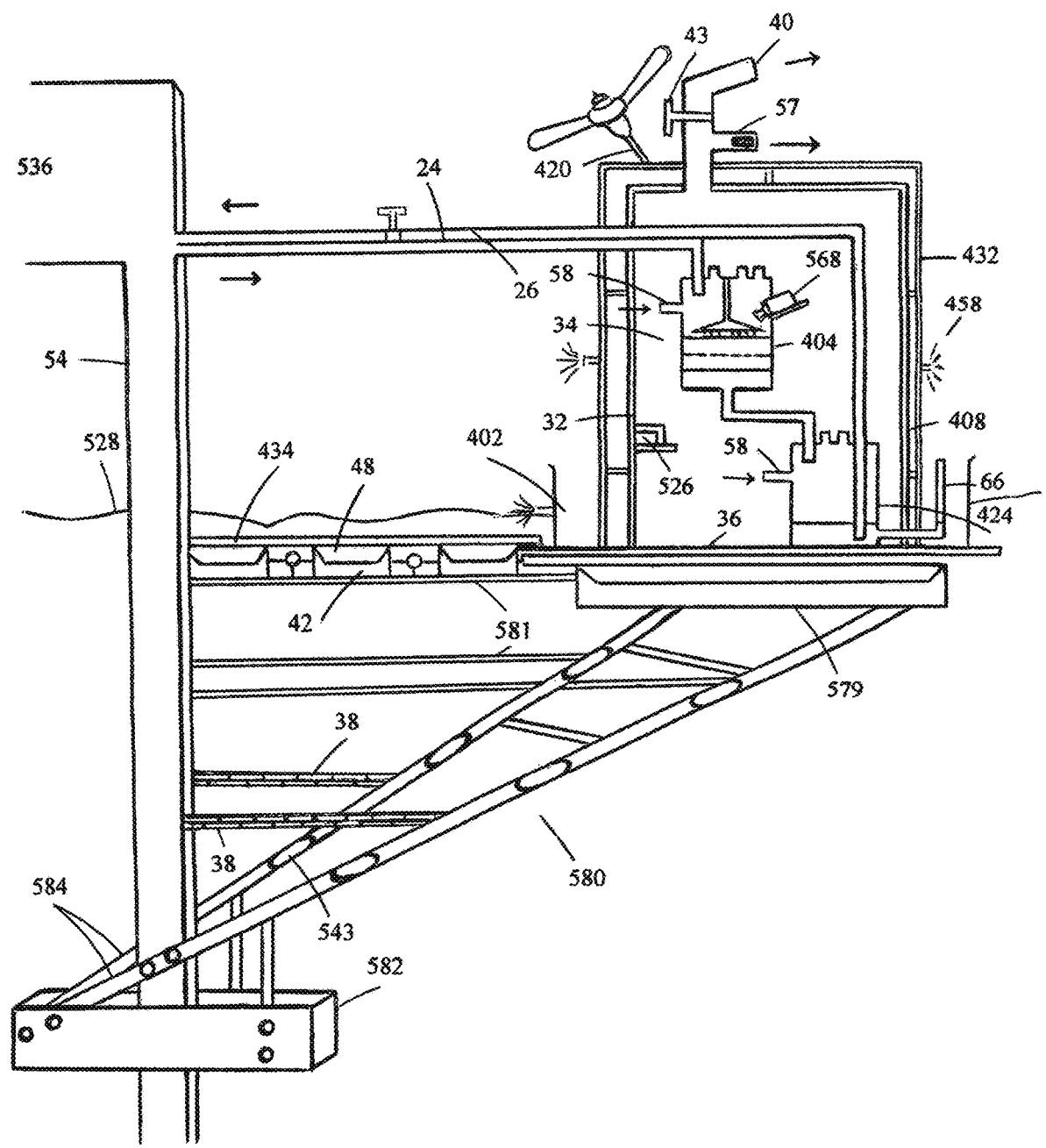

FIG. 6: The drawing illustrates 'A Schematic of a Submerged Anchor Base for the Positional Disposition of a Sea Level Gas Separator of Oil Well Effluent unit' about the rig site.'

Figure 7:
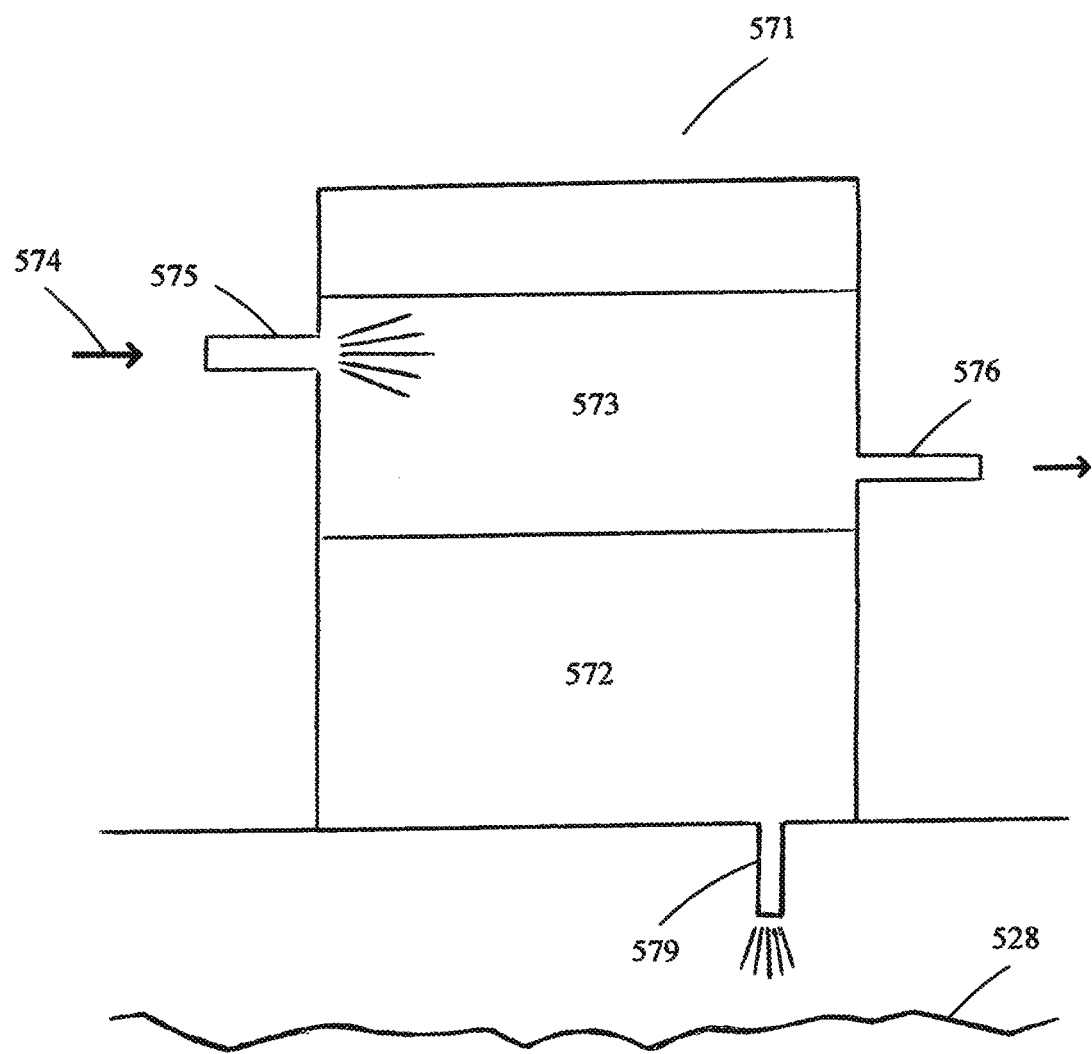

FIG. 7: The drawing illustrate 'A schematic of an Oil-Separator Tank of the Blown out Well Effluent with Admixed Ocean Waters'.

DETAILED DESCRIPTION OF THE INVENTION

The following is a detailed elaboration of what was earlier briefed in the section foregoing, about the scheme of 'Subsea level Oceanic Diversion of a Gas Entrainment' (shown in FIG. 2), and additionally, about the two variable models of 'Sea Level Gas Separator of Oil Well Effluent' (SLGOE) Unit, the outline of a prototype illustrated in FIG. 1. An 'effluent' herein is generally defined as an admixed formation of an under ground oil containment, substantially in its natural form, containing gaseous hydrocarbons like methane and the liquid and semisolid crude of petroleum analogs, emanating with or without a conduit of 'production tubing'. The scheme of oceanic 'diversion' of a highly pressured 'gas entrainment' is incorporated into the system during a predictable time, as when the down-hole digging is reaching or had reached its completion. How-ever, following the acute event of subsea diversion of the 'gas entrainment', when an admixed effluent starts to emerge, the 'Emergency Operational SLGOE' (EOS) Unit takes over the function (a prototype shown in FIG. 1), as the latter is particularly designed to separate gaseous elements from the liquid and semisolid crude of petroleum analogs, thereby preventing oil pollution of the oceanic ecosystem. The MOS unit is functional at all times, following the incorporation of the 'production tubing'. The operations of either unit is devised to be flexible based on the options of the oil company as also upon the future cumulative experience, however, the present devising strives for simpler operations as also of requiring fewer of the armamentarium. The unique structural/technological differences between the two models of the SLGOE unit, as devised, are sufficiently outlined in the following sections. The SLGOE unit is structured within a shell of a 'modular' unit (the latter shown in FIGS. 5 and 6) situated at a safe distance, but within the vicinity of a rig.

FIG. 2, as illustrated, shows a scheme of oceanic gas entrainment diversion, which is simple in its operation, but as can be seen in the drawing, is devised to be contrastingly different from the basic model of flow-control by a 'valve' mechanism. The herein devised scheme is not to resist the gas under tremendous pressure, but to instantly dissipate it, by a method of 'gas diversion' altogether, said difference pursued, because the flow-control by valve mechanism at times failed to contain, and let out the inflammable gases into the rig confines. The valves are proven ingenious inventions, however in certain set ups as in oil wells, occasionally with immense pressures not elsewhere encountered, the valves inherently lack provisions to 'resist' such pressures (it is not with out realization that the conventionally elected Blow-out-preventer is more than a valve, and contains different operational components). The valves are probably better suited to resist pressures originating from within narrow caliber conduits, such as a 'production tubing', at least in few instances of unexpected pressures. However, when an innermost casing conforms to an oil conduit, as before a well completion to its last functional detail, a situation similar to Deep Water Horizon Oil Well blow out. The needed resistance of the Blow-out-preventer (BOP) to be exerted in this instance, is against a well containment under immeasurable pressure. Most, though not all BOP failures probably happened/happen under such circumstance, if not for unrecognized technological failures. Hence, it is prudent that yet another mechanism in conjunction be set forth in place, to mitigate BOP failure and the resulting calamity, for a so far insurmountable 'situational calamity', about the time of the down-hole completion, and upon the elected time of accessing the under ground oil containment.

A Scheme of Subsea Level Oceanic Diversion of a Gas Entrainment

Subsea Level Diversion of a Gas Entrainment by Sumathi Paturu's 'Gas Entrainment Diversion Tubing' (Sumathi Paturu's GDT)

Around the time of down-hole completion and about other occasions when pressured gas effluent is a reasonable threat, it can be planned that the gas entrainment will not reach the rig site, the devised plan additionally mitigating extensive damage otherwise sustained by the marine riser and the drilling conductor. The FIG. 2, not drawn to scale, is a schematic of the devised structural measures to weather out a calamity. It illustrates: a bore well 403 with all its casements cemented; a well head 510; a BOP 512; a drilling conductor 520; a marine riser (showing a riser pipe 280, and the riser's outer boundary 518) reaching a rig level 536; the riser space 524; a 'production tubing' 514. The FIG. 2 also shows multiple 'Gas Entrainment Diversion Tubing' (GDT) 508.

Sumathi Paturu's Gas Entrainment Diversion Tubing (Sumathi Paturu's GDT)—as was earlier noted, the GDT 508 is incorporated into the system at a time the well's blow out starts to emerge as a threat, that is, as the drilling of a down hole is reaching completion to be amenable for a 'kick' from the oil containment. The bottom strings of the riser-conductor, as close to the well head as feasible, are devised to incorporate large GDT 508 (FIG. 2), at least two, as horizontal tubing in circumferential equidistance. Arising from the riser pipe and emerging from the conductor, each GDT bends down as a down turned terminal (DTT) 509 opening into the sea, whereas, an up-going Effluent Diversion Tubing (EDT) 400 terminating into the Emergency Operational SLGOE unit (the EOS unit) also arises from the GDT at the point of said down turn. The EDT 400 is normally clamped by a sturdy clamp 254 at its origin, to be optionally opened, that is, at the conclusion of the GDT functioning. The DTT 509 is provided with one way valves 125, so as the gas entrainment is let out from the riser space 524 into the sea. A gas alarm located down-hole prompts the crew to extinguish all ignition sources, as also closing the rig site closure 452. A downward disposition of the terminals 509 prevents the TVH of the water column to exert its pressure upon the one way valves. The tips of the DTT 509 is also not subject to the full effects of 'possibly heightened' hydrostatic pressure (upon the aquatic perturbations) from the open body of the adjacent sea water, in accordance with the Pascal's law (the pressure exerted at any point in a closed body of fluid is equally exerted at all points within the closed space) as also due to the downturned disposition of the terminals 509. The GDT 508 can be structured also about the midway of the riser-conductor and additionally about the top strings, a designing that greatly attenuates a gas entrainment in the event it reaches the rig site, precluding an explosive fire. The top GDT if chosen to emerge above ocean waters, the DTT still dips into a safe depth about the ocean, such model shown in the FIG. 2. For the reason that the entrainment is being let out instantly through the GDT 508, the riser and its vital structures are protected from a damaging blow out. The GDT 508 emerging from the riser pipe 280 is exteriorized in entirety from the riser's outer auxiliary 'power' and 'control' lines. The gas entrainment led into the ocean will not result in pollution of the aquatic ecosystem to any extent, the inflammable gases being insoluble in water. Though the FIG. 2 shows the devised schematic only in the right side, not to crowd the drawing, it is implied such schemes are multiple.

As mentioned, the commonly encountered inflammable gases like Methane being insoluble in water, the concern is legitimate that the giant gas bubble can rise from the aquatic depths into the surface 'air gap', again like a gas entrainment causing an explosive fire, having encountered the atmospheric oxygen. However, the gas bubble let out of the GDT and emerging into the surface water, is neither pressured nor explosive (as per the Pascal's law, whatever be the pressure, it is being dissipated in an open body of water, unlike the pressure that is being maintained and exerted equally at all points in a closed body of water), but as a cautionary, the gas bubbles are prevented to rise and pervade the 'air gap' and the rig confines by fractionation and further diversion to distant destination. It is materialized by a structural 'addition' about the time of down-hole completion, encompassing a gas 'Fractionation and Diversion' device, appended to each of the down-turned GDT terminals 509. The GDT must be always readied for such distant diversion, even before the down hole penetration.

The 'Gas Fractionation and Diversion' Device

The underlying principle of the 'Fractionation and Diversion' device (FDD) is to divide and dissipate the volume and power of a giant gas entrainment. The prototype of the device consists of a large metal trumpet (the 'well site' trumpet) with its threaded stem articulating with the DTT 509, whereas its flat bottom comprises 4-5 large openings, wherein, from each opening a lengthy rubber tubing originates. The rubber tubing traverses to different circumferential destinations about a safe distant radius of 40-50 meters, where each tubing also ends in an inverted metal trumpet (the 'off-site' trumpet) affixed to the ocean floor. Its flat bottom also comprises large openings wherefrom small metal tubing diverge outwardly. With at least 6 GDT deployed at 3 different levels of the riser, a gas entrainment is divided into 24-30 fractions, wherein 4-5 openings are configured in each of the 'riser site' trumpets. The 24-30 gas fractions are again fractioned about the 'off-site' trumpets to a number multiplied by—the number of openings in each of the 'off-site' trumpet. The gas that emanates through each 'off-site' trumpet rises to the atmospheric air at a safe distance away, wherein it poses no threat to a rig by its volume or pressure. The devised diversion is the safest and most elaborately devised plan, deserving of the enormity of the giant entrainment.

Capping the GDT terminal—the event of a gas entrainment is prompted to the crew by gas alarms about the down-hole, and also about the midway of the well, set forth as a mandate nearing the time the down-hole is reaching its completion. After the critical time had passed, the 'riser site' trumpets can be disarticulated and the DTT 509 capped by robotic arms, as the aquatic ecosystem otherwise may be significantly contaminated if an oil-gusher follows. At least one of the tubing terminating into an 'off-site' trumpet carries along with it a 'water sampling tube' (normally closed by a sturdy closure about the rig terminal), wherefrom the ocean waters are sampled periodically, with a strategic initial pause in timing, to check when the oil starts to flow into the ocean waters. When the emerging gas bubbles seem to be scanty or none (as recorded by a night-vision video device installed with firm unshakable footage about the site) and the water sample shows presence of oil, the 'riser site' trumpets are disarticulated, and the terminals 509 capped. The threaded DTT 509 can optionally comprise of affixed caps hung by lengthy chains to seal the terminal. If the 'cap head' with an affixed chain to the head top, closes clockwise, to start with, the chain is twisted on itself to make 5-6 anti-clockwise turns, and then the cap can be easily screwed on to the DTT terminal. As the DTT 509 is capped, the EDT 400 can be unclamped, as an oil-gusher of admixed effluent may follow, and it should be diverted into the EOS unit for oil-gas separation and 'let-out' to different destinations.

The incorporation of the GDT—the riser and the conductor strings are manufactured to incorporate the GDT 508, the latter materially similar as the former two. The conjoining of the GDT of the riser and the conductor is done in the conductor space, while the riser is being deployed, the devised mechanism of conjoining effectuated by means of a sturdy 'sliding screw', operable in accordance with the applicable matter discussed at the conclusion of this disclosure. To allow for imprecision of approximation and to accommodate other demands possibly required of a riser deployment, the conjoining tubing comprises an intervening segment of rubber tubing.

DIVERSION OF AN OIL GUSHER—the additional function and advantage of the GDT 508 is, it can also divert an oil gusher into the oceanic waters, wherein the enormous pressure of the gusher is minimized, as also the part of the gusher reaching the rig is being minimized. Though the oil effusion pollutes the aquatic ecosystem initially, its otherwise incessant flow into the water can be limited as follows: all the DTT tubing (or the 24-30 of the emerging rubber tubing) can be connected to oil receptacles, and also the EDT opened for the oil to flow through the EOS unit, as means to open many possible avenues to collect the oil.

The Prevention of a Well Blow-Out

Most importantly, the devised system in addition endeavors to prevent a blowout, possibly in conjunction with the revised mechanics of the globally employed conventional Blow-out-preventer (BOP). Worldwide experience must have taught, up to what pressures of a gas entrainment that the BOP being presently used could contain, and at what pressure a well blow-out was an invariable event—that is, about the time of a down-hole completion. Based on such knowledge, it is prudent that the BOP should be designed to contain only the pressure threshold that was containable, and for pressures exceeding, it should let out the well effluent. An exceedingly pressured effluent, which in most instances can be the feared 'giant gas entrainment', as it enters the 'riser pipe', will be let out into the ocean through the GDT 508, and so precluded to enter the rig site. Though the GDT 508 lets out a giant gas entrainment into the ocean in any instance without letting it into the rig confines, in the proposed scheme it is doing so without a damage to a well head and its vicinity.

Despite the foregoing schematics, the nature's wrath and the enormity of a gas entrainment may far exceed all human limitations of precautionary measures and devices, and at least a part of the pressured entrainment may yet reach a rig site. Hence, it is a wise proactive choice to have all the 'gas and fire' safety measures instituted in a rig, as if the above plans were not incorporated. How-ever, the schematic is not without benefit, that is—both the eventful number and the enormity of the entrainment are substantially minimized, or in other words, are controllable and made amenable to human interventions to prevent/stop a rig fire that may otherwise be unstoppable and catastrophic.

The Sea Level Gas Separator of the Oil Well Effluent

FIG. 1, illustrates a prototype SLGOE model which is simple in its operation, as can be seen in the schematic. To accomplish the function of oil gas separation and diversion to elected destinations with or without an accompanying catastrophic event, as well as to accomplish the oceanic diversion of the pressured gaseous elements, the SLGOE model is configured as two separate entities of minimal structural differences, such as:

1) Emergency Operational SLGOE (EOS) unit, situated about the rig site, and
2) Routine and Emergency Operational SLGOE unit, that is, a Multi-operational SLGOE (MOS) unit, also situated about the rig site.

1) The Emergency Operational SLGOE (EOS) unit—the EOS model set forth about the rig site at a safe distance, becomes functional when there is effluent let out' into the riser pipe 280, with a well blow-out. The scheme of GDT 508 also incorporated into the structural design will divert the highly pressured gas entrainment into the oceanic waters, but subsequently, the 'oil flow' that may follow with or without admixed gases, needs to be diverted into the EOS unit to avoid wide spread pollution of the aquatic ecosystem. In the instance of a well blow-out, there is a possible damage to the structures about the well head, with the oil occasionally finding its way into the waters, the latter implying that the marine riser and the drilling conductor are disrupted, wherein the fluid level and pressure within the riser equalizes with the surrounding water, disrupting the functions of the EOS unit. In fact, upon the 'Deep water Horizon' oil well blow out there was a total wipe out of the well head structures. The original application (U.S. Pat. No. 9,175, 549) described means and methods to deal with such situation, wherein the well bore can be easily accessed (and needs to be accessed) for immediate containment measures. However, this disclosure enumerates the means and methods to deal with, wherein the well head structures are materially intact, but breached significantly that there is oil leak into the body of water that gets progressively worse due to the water in turn finding its way into the oil containment, rising its pressure.

2) A Multi-operational SLGOE (MOS) unit—this SLGOE model, also located about the rig site at a safe distance, is functional at all times following deployment of the 'production tubing' as an oil conduit. Despite a structural breach in the production tubing/collection system resulting in a substantial leak when there is a blow-out, significant part of the oil-gas effluent under tremendous pressure, can still find its way into the rig, through the production tubing/collection system. Hence, it is schemed that the oil collection system reaching the rig is routinely by-passed, to enter the in-vicinity MOS unit, and the oil returned to the rig only after the gaseous elements are separated. As a well blow-out following deployment of the 'production tubing' is generally a predictable event rather than not, the 'subsea' water diversion of the pressured gaseous elements from the MOS unit can be always planned, as also precluding the explosive let out' of said gaseous elements into the tanks of the MOS unit, the latter filled with oxygen-free atmospheric air about this time (wide infra).

The foregoing two models functional in different circumstances, however are structurally configured with only minimal differences that will be contextually elaborated in the following sections, along with suggested action plans, where ever appropriate.

(1) the Emergency Operational SLGOE (EOS) Unit

To make the description better comprehensible, both the FIGS. 1 and 2 are herein simultaneously described. The FIG. 1 illustrates the prototype SLGOE model. The FIG. 2 depicts different extents of situational calamities about the well site, to separate the nature and course of events accordingly, to delineate what the difference could be with: (a) the scheme of an instant subsea level diversion of a gas entrainment into the oceanic waters by the EDT, and (b) the EOS unit, incorporated into the system. To start with, a basic prototype model of a SLGOE unit with an oil dispersion device, as in FIG. 1, is described in the following.

A Prototype Model of the SLGOE Unit and its Flow Principles—

The FIG. 1, not drawn to scale, illustrates the schematic model of a 'Sea Level Gas Separator of the Oil Well Effluent' (SLGOE), named as 'Sumathi Paturu SLGOE model'. FIG. 1 shows an Effluent Diversion Tube (EDT) 400, diverting the well effluent from the source, to the SLGOE unit. The Effluent diversion tube 400 is structured to be leading into a moderately large metal (preferably steel) gas separator tank 404 of the SLGOE unit, entering through its top, as its inlet tube 406. The bottom of the tank 404 has sieve-like perforations 76, whereas the top of the tank 404 is fitted with widely configured gas outlet tubes 78. The tank contains a relatively smaller additional compartment 82 below its sieved bottom, said compartment fitted with a large bottom outlet tube 84, its diametric configuration devised to be wider than the well's incorporated 'production tubing'. The bottom perforations 76 of the tank are in a strategically configured concentric arrangement of circles, designed to filter the effluent, to prevent occasional blocks to the bottom outlet tube 84, by large globs of semisolid effluent. The gas separator tank 404 has provision for a 'dispersion device' (FIG. 3) 583, to disrupt the semisolid effluent in its bottom, whether or not blocking the perforations 76. The dispersion device 583 is detailed subsequently.

The oil effluent entering the gas separator tank 404 at its top through the inlet tube 406, down-flows into the spacious milieu of the tank. Such down-flow of the effluent instantly separates the gaseous components that will reach to the top of the tank to be diverted into a separate gas collection system. The liquid effluent with the incorporated semi solid oil components flows down to the bottom of the tank 404, wherefrom the outlet tube 84 lets the oil out continuously into an 'oil passage' tank 424, located yet at a lower level, wherein the oil flows from the top. The 'oil passage' tank 424 is also fitted with widely configured cluster of gas outlet tubes 74 in the top (to also join the gas collection system), whereby any remaining gaseous components of significance can be further separated, such separation also deemed instantaneous. From the 'oil passage' tank 424, through a tube 428, oil is returned through an 'oil collection tube' 430 into the oil collection system, by mechanical means thereof. Such means, for example, are aided by laws of hydraulics, conforming to the 'siphoning' principle. In this instance, the tube 428 originates from the bottom liquid column of the 'oil passage' tank 424 to reach a higher level. This incorporated model of 'oil passage' tank completely alienates the 'drawing force' (the latter as an effect of the 'siphoning' principle), whereby the gaseous components will not be otherwise sucked into the down-stream liquid oil collection system. Such 'drawing force' created by the 'siphoning' principle is exclusively directed to the lower level semisolid/liquid effluent column within the 'oil passage' tank 424, in effect, returning the oil to higher levels. The inlet and outlet tubing of the SLGOE unit enter/exit the encapsulating modular unit above the surface waters.

The instantly separated gaseous elements about the top of the tanks readily enter the gas collection system with great ease, for the reason that the commonly encountered gases like methane having a low molecular weight (which is 16 vs. 32 for oxygen, 44 for carbon dioxide, and 28 for nitrogen—to make a comparison). As most of the gaseous elements originate in the top of the tanks to start with, only some separated lower down, it is the greatest advantage in the devised model. Even with regard to a liquid gusher, its force is attenuated by the instant separation of the gases, whatever be their proportion (as yet deemed to be contributing to the force).

Only the flow principles are herein outlined, the further structuring details of the SLGOE unit(s) discussed later.

The unique plan of gaseous separation and the safety provisions in the devised model—the gas collection tubes 74 and 78 are not only large but are fully clustered, as mentioned, occupying all the available space of the top of the tanks. Such arrangement of voluminous gas out flow from the tanks is highly efficacious facilitating the exceeding volume to instantly dissipate the exceeding pressure of the gas in the containment tank (the volume and pressure within a 'gas containment' being inversely proportional), that the descent of even a very high pressured entrainment to the bottom of the tank, is unlikely (as also most of the gaseous elements originate in the top of the tank to start with). Additionally, the tanks of the MOS units are filled with oxygen-free atmospheric air, so that an explosive fire is precluded in the event the pressured gaseous elements enter into the spacious 'milieu' of the tanks. In the 'fire triangle' of 'fuel-oxygen-ignition source', the oxygen source is eliminated from within the containment system.

The Facilitating Additional Structural Measures Incorporated about the Well/Rig Site, to Weather Out a Calamity In the event wherein there is a gas entrainment entering the riser pipe 280 upon a well blow-out, structural measures have to be in place to weather out the calamity, even before the well digging is initiated by the oil company. The FIG. 2 incorporates a schematic of a well blow out, and the devised additional structural measures, as in the following.

The rig level closure—the marine riser and the drilling conductor can be sealed from the rig by an air-tight closure 452 situated about the rig level. The closure is of any size (can be even a room of optimal size with a bullet-proof air-sealed glass window) and of any configuration (how ever with a strong broad trafficking door sturdy as a bank-vault door, devised to be promptly shut by remote/manual operations upon a gas alarm), so that the passage of the inlet and outlet tubing, wiring, and other hardware are properly isolated and air-sealed by virtue of the availed space. The closure 452 shown in FIG. 2 is merely a schematic, denoting its location about the rig level. Such structuring can be effective to electively seal the riser 518 and the drilling conductor 520 from the rig, when drilling the down hole is reaching its completion or reached its completion, and a well's blow out will start to emerge as a reasonable threat. Additionally, about its exterior, the rig level closure 452 is clustered with upward tilted high-powered fans, activated by the down-hole gas-alarm, to drive up the blown-in gases skyward, that they will not breeze into the rig. This is directed to the event wherein the rig level closure 452 is breached by the force of a gas entrainment. Said up-tilted fans surrounding the closure 452 can be of maximum size feasible, preferably on a broad-based grid (studded with high powered sprinklers) with a height surpassing the in-vicinity rig structuring, however, with a safe-guarded passage set forth for the mandated trafficking of the workers. The broad-based grid may not be blown out, as it is not situated in a place that is confining to a gas entrainment, which at this time, is directed skyward. An explosive fire is possible, however, it is controllable and limited, as, even a giant gas entrainment is fractioned to a minimum, blown up skyward, and additionally extinguished at the outset by the powerful sprinklers that were already set forth to be operational, preventing its spread towards the rig. The security team guarding the rig level closure 452 during this vulnerable time, will also use large 'fire-extinguishers', their flow pressured and capable of distant ejection.

The Effluent Diversion Tubing—the EOS unit also is incorporated into the system at a time a well's blow out starts to emerge as a threat, that is, as the drilling of the down hole is reaching its completion, and is amenable for a 'kick' from the oil containment. In the devised scheme, in conformity thereof with FIG. 2, an effluent diversion tubing (EDT) 400 starts as an up-going tubing about the point of the down-turning of the terminal of the GDT, the EDT 400 to be entering the gas separator tank 404 (FIG. 1) of a rig site EOS unit.

Depending upon the height of the riser, a great amount of the blown out effluent is diverted away from the riser pipe at multiple levels about the strings. Accordingly, the EOS unit can receive a substantial volume of an admixed effluent, however, the gaseous elements are not pressured, as a pressured entrainment was already let out from the GDT almost to a total extent. Even if a fraction of the gas entrainment if reaches the rig level (if the rig level enclosure 452 is not closed), it may not result in a wide spread rig fire, and can be successfully dissipated by the blowing fans surrounding the enclosure 452.

An 'oil gusher' reaching the EOS unit—once the pressured gas entrainment had ceased from the oil containment, a limited oil-gusher may start to emerge, which may not be let into the ocean waters, and had to be diverted into the EOS unit by opening the clamp 254. The effluent at this time is invariably admixed, as the inflammable gases like methane merged into the oil under pressure now start to emerge in their gaseous form, and tend to gush out along with the crude of petroleum. Hence, the EOS unit is devised to deal with an admixed effluent, as in the manner elaborated earlier, wherein the pressure of the let out gaseous components are also designed to be attenuated (due to voluminous gas outlet pipes). Additionally, there can be a provision for the oil collection system from the EOS unit to transit through an 'oceanic pressure let-out tank' that partly lets out oil under tremendous pressure, temporarily into the ocean waters, through a massive tube with incorporated 'pressure outlet valves' of set forth pressure threshold, so that an oil gusher will not flood the rig. However, oil collection by extreme capacity receptacles in the sea/land, is done on an earliest occasion. It also implies that at least limited oil and gas collection means and land diversion measures have to be in place at this time, if an elected attempt of oil tapping had not been thus far done. Though there can be at least 6 EDT 400 emerging from the riser at different levels, they can converge into one or two, before entering into the EOS unit. A single EOS unit is functionally sufficient, as, to start with, even an 'oil gusher' (a gusher without dominant 'gaseous components') is let out into the ocean through the GDT 508, and the functioning of the EOS unit is only initiated later. Collecting oil of an incessant gusher via trumpet tubing was already described.

The well site alarm—the well head 510 about its well side, and the well about the midway need to incorporate gas sensing alarms that ring into the rig, whereby the rig level enclosure 452 is promptly closed, so that even the gas entrainment that was dissipated to a greater extent, will not enter the rig, and be diverted back into the GDT 508/EDT 400. Such alarm, as was earlier mentioned, is also incorporated about the down-hole, as its drilling is reaching completion. These are the greatest and the simplest additions that alert, prevent, and protect from an explosive rig fire. It is most effective about the time of well completion when the gas entrainment is the greatest threat, whereas, at other times, a proportion of inflammable gases within the effluent is common rather than an exception, as also said proportion of gases being not of threatening volume, or of threatening pressure. Accordingly, use of such an alarm is differed at other times. Wherein an oil gusher is an anticipated concern before the time of down-hole penetration, an additional oil-sensing alarm is also incorporated.

The GDT closures—the GDT 508 structured as at least 6 tubing originating from within the riser pipe 280, is optionally devised to be normally closed by sturdy 'GDT closures' (not shown in the drawings) set forth within the riser pipe 280, the closures instantly opened upon the gas / oil alarm ringing from any of the well site alarms—about the down hole, the well's mid way, or else about the well head.

The gas entrainment as a later event—following the installation of production tubing as an oil-conduit, a gas entrainment can be eventful following a brief or lengthy 'holiday' to the oil collection for whatever reasons, and the EOS unit should be readied as a 'proactive' measure, before restarting the oil-collection system. It is better done in conjunction with 'uncapping' of the GDT to start with, to let out the gas collection of significant measure into the ocean, if there is a breach to the production tubing, or else, the MOS unit is equipped to deal with the pressured oil/gas elements. A later section details the sequence of such operation encompassing a MOS unit.

Consequences Upon a Well Blow-Out with the Incorporated GDT and the EOS Unit (with its Accessories), and Suggested Action Plans The structural breach about the well head depends upon the severity of the blow out. In mild cases only the 'production tubing' 514 would be breached (540) (in an instance wherein a blow out happens after the production tubing is installed), whereas with increasing severity, the riser (280 and 518) can sustain damage (544) followed by damage (546) to the drilling conductor 520, in the latter event, the oil flowing into the ocean waters. In all the events when ever the 'production tubing' is involved, such events encompass precise timing, and hence can be accordingly planned, as detailed in the subsequent sections. The consequences of a well blow out as per the severity, are outlined in the following.

1. Following damage to production tubing 514, the pressured effluent will be forced into the GDT 508 from the riser space 524, whereby a diversion of the gas entrainment is achieved. Following the acute event, when the pressured gaseous elements cease to flow into the GDT 508, the admixed effluent is directed to the effluent diversion tubing (EDT) 400 (by unclamping its clamp 254 at this time), to reach the EOS unit, wherein a gaseous separation is destined and the oil diversion is effectuated, in the event that the effluent is significantly admixed. With the force of the effluent attenuated, the oil and gas reach their designated destinations. Though most of the gaseous entrainment is let out into the GDT 508, a fraction will find its way also through the production tubing 514, and reaches the rig level (see the FIG. 2) 536, but by-passes it to flow through the MOS unit 34 for eliminating its gaseous components, to then be returned to the rig 536 (FIG. 4), if there is any extent of remaining non-gaseous components. In a situation wherein the production tubing 514 is not yet installed, the blown out admixed effluent is designed to enter only the diversion tubing 400 to reach the EOS unit.

2. Following damage to the riser 518, as long as the drilling conductor 520 is intact, the gas entrainment is still let out from the GDT 508 into the ocean waters. An admixed effluent can be electively diverted into the EDT 400 (to reach the EOS unit) soon after the entrainment ceases. It also flows through the production tubing 514, wherein through the latter the effluent ultimately entering the rig level MOS unit, with the events not different from those in the foregoing section 1. When the rig level enclosure 452 is sealing, the events as in sections 1 and 2 are greatly facilitated.

3. Following damage to the drilling conductor 520, the riser 518 and the conductor 520 communicate with the ocean water, and the flows through the production tubing 514 and the effluent diversion tubing 400 (the latter entering the EOS unit above the ocean surface 528) stop, as the pressure and fluid level within the riser and the conductor are equalized with ocean waters. However, to a larger extent a gas entrainment is forced out through the GDT 508 into the ocean as well as also escaping through few or many of the structural breaches. It implies that even after an extensive damage about the well head structures, the GDT 508 is still very effective in forcing out the 'gas entrainment', to greatly attenuate it before reaching the rig site. The 'gas entrainment' may also be dampened by the fluid column within the riser-conductor, the latter behaving like an open body of water due to communications with the open sea through the structural breaches sustained at this time (how-ever the filling of the riser pipe takes few seconds to minutes, by which time a fraction of the entrainment can ascend to the rig level). Some flows through the production tubing 514 may continue, because of the mechanical forces set forth in place being still partially operable.

Action plan following damage to the drilling conductor—unhindered, the 'oil spill' into the ocean can be incessant, progressively turning into a spewing geyser. It is due to different densities of the two liquid bodies concerned, the lighter petroleum oil rising to the water surface as the heavier ocean water finds its way into the oil containment, progressively rising its pressure. Hence aiming for a swift response to seal the leaks is paramount. FIG. 2 also shows immediate temporary measures, though not all encompassing. In this instance, the surface structures are intact, with the well bore and the well's innermost casing not easily accessible to seal with a 'pneumatic sealer' (the EPSE/SSE, that is, the 'Evolved Pneumatic Sealing Ensemble' or 'Simple Sealing Ensemble'; U.S. Pat. No. 9,175,549) described in the related patented disclosure by the Inventor Applicant. As a temporary measure, a device of strong rubber sheath 558 with its top hardware 548 can be articulated with a devised complimentary hardware 564, located all around the drilling conductor, at different strategic levels. The chosen level of the complimentary hardware 564 of the conductor is deemed to be higher than all the breaches (546) to the conductor 520. A bottom level hardware 560 also devised about the lower edges of the rubber sheath 558, can be burrowed into the ocean floor and cemented. The top approximation with the conductor 520 is also cemented to create a water-proof barrier, whereby the EOS function can be restored, if a moderately pressured fluid column of the riser space persists (the oil company should store few rubber sheaths to suit different heights). Meanwhile, preparations are made to access the well bore to seal with the pneumatic sealer, followed by a permanent structuring of a 'NEW INNERMOST REPARATIVE CASING' (U.S. Pat. No. 9,175,549) to seal all the leaks (including those communicating with the distant ocean craters). It is aimed that the rubber sheath 558 is also sized to surpass the Diameter of Disruption (DOD) on the ocean grounds, though it may not be possible at all times. After the rubber sheath 558 is cemented creating a waterproof barrier, the liquid column within the conductor/riser is suctioned out from the rig level, so that a relatively liquid free riser space is created to work on the well bore. It is impossible to stop ocean water finding its way from the near and from the distant ocean craters through the breaches of the innermost casement until the time a 'NEW INNERMOST REPARATIVE CASING' is cemented, but the water can be constantly suctioned out to create a 'workable milieu' while also a pneumatic sealer (the EPSE/SSE) effectively blocks the effluent from the well-containment below. It is implied that the 'pneumatic sealer' is deployed before the well's pressure had mounted to be uncontrollable, or else after it is optimally controlled. However, the 'pneumatic sealer' also is devised to effectuate significant counter pressure by its accessory structural connections about the rig level, to counter its buoyancy and stabilize it at its stationed site within the well bore. Said counter pressure is supplanted primarily through a structure similar to a 'production tubing', to be installed at this time (if not present already) as an 'oil conduit' emerging through the stationed 'pneumatic sealer'.

Reparative measures by finding the highest level of the breaches about the drilling conductor—large visible breaches can be easily identified. About the level from where they are imperceptible, to identify them, under water 'night-vision' video cameras are installed about this level, also with surrounding brightly illuminated lights. Liquid pastel color (preferably pink and yellow) is instilled from the rig into the liquid column between the riser and the conductor, whereas the video cameras detect the highest level where the color seeps through the conductor into the ocean waters. It is also observed by a video device within the riser to note the highest level of its breaches. Wherein the first attempt fails, a different brighter color (red, dark green or dark blue) is used the second time, to detect a suspicious higher level of the breach. The oil company can also employ sophisticated methods like sonar flow-detecting devices, directed to the suspicious confined areas and they can be confirmatory. All the breaches of the conductor, if possible, are cemented (from outside) upon a sheath of metal scaffold covered with a dense cement-impregnated metal mesh, wherein the wide borders of the mesh (wider than the underlying metal sheath) overlaps the surrounding un-breached areas, while the mesh is further strengthened by few layerings of cement (such reparative patches made to be available in pre-configures sizes). QUIKRETTE, a Hydraulic water Stop Cement (number 1126), a high strength material with quick consolidating properties even while wet, and available as above or below grade strengths, is suitable for a quick setting in 3-5 minutes. Wherein a doubt lingers, testing for breaches is repeated after the color clears off from the fluid columns. The riser strings with confirmed damage are replaced, as a 'high reliability' riser is paramount for the well's functioning. The production tubing, if already incorporated, is amenable for replacement when the well bore is worked on to cement a smaller 'NEW INNERMOST REPARATIVE CASING' to seal all the breaches of the well bore including those communicating with the distant ocean craters.

(2) the Multi-Operational SLGOE (MOS) Unit

The MOS unit 34, illustrated in FIG. 4, 5 and 6, not drawn to scale, is shown to be structured within a modular capsule 32. The modular and its basic structural disposition otherwise exemplifies either the MOS unit or the EOS unit in the rig vicinity, about the surface waters. The MOS unit, multi-purpose in its function, receives the effluent directly from the production tubing 514/oil collection system, however initially by-passing the rig 536, as was earlier specified. The inlet tube 24 is similar in its functions to the prototype SLGOE unit's inlet tube 406, described earlier. The MOS unit, as specified, receives the well effluent all the time following the installment of the production tubing, to separate its gaseous elements. In the same token, it also receives the effluent after a blow-out, as it was mentioned already that a part of the blown-out effluent apart from flowing into the riser space also flows through the production tubing 514 to the rig level. Following gaseous separation within the tanks of the MOS unit, oil returns to the rig through the outlet tube 26, whereas the up flowing gas reaches its destination through an outlet gas pipe 40. The gas pipe 40 is a very large common pipe for all the merging gas outlet pipes 78 and 74 of the tanks (as in conformity thereof, with the earlier described prototype SLGOE unit). It may be noted that before the incorporation of the production tubing 514, the MOS unit is not a part of the oil collection/gas separation system of the well/rig.

The Oceanic Diversion of a Gas Entrainment as a Later Event, and the Incorporated Structural Measures of a MOS Unit Once oil collection commences uneventfully and proceeds uninterrupted, a gas entrainment or an oil-gusher as an aftermath is improbable. One of the exemplary instances as a 'later event', is, as when oil collection resumes following a lengthy 'holiday' for whatever reasons, when there is possibility of a moderately pressured gas entrainment, wherein the MOS unit operates as an integral part of the rescue system. However, the foregoing being a predictable/planned event, the GDT 508 kept uncapped at this time, is the primary rescue measure if the production tubing is breached by the enormity of the pressure. When the production tubing remains intact, the following measures apply for the oil collection following a lengthy holiday.

The Additional Structural Measures Required of a MOS Unit for the Scheme of Oceanic Diversion of the Gas Entrainment—

FIG. 4 shows the schematic drawing of the structural measures required of a MOS unit for the needed scheme and the flow principles required of the oceanic diversion of the gas entrainment' which is in addition to the scheme of structural measures and flow principles shown for the EOS unit in the FIG. 1.

1) A 'sideward outlet tube'—the common gas pipe 40 of the MOS unit modular (FIG. 4) is provided with a large 'sideward outlet tube' 57 with 'one way valves', to be opening upon a set forth pressure threshold, said outlet tube opening into the ocean waters at moderate depth, where the pressured gaseous elements will be led into. The outlet tube also has a sturdy clamp to close as needed; 2) A clamp 43 to the common gas pipe 40 of the modular unit, immediately distal to the 'sideward outlet tube' 57; 3) A 'pilot side tube'—the 'oil passage' tank 424 of the MOS unit is normally provided with a L shaped 'pilot side tube' 66 about its bottom, the horizontal limb of the 'pilot tube' being let out through the modular unit 32, where from a perpendicular vertical limb (with closed top) arises, the latter through a lengthwise bullet proof (or laminated) glass window, meant to be showing the 'column features' of the fluid effluent within the tank 424 (the pilot side tube can be incorporated into the EOS unit also); 4) A 'bi-pronged tube'—a normally clamped stem (not shown in the figures) of a 'bi-pronged tube' is set forth outside the modular unit 32, each prong 58 of the stem entering either tank of the MOS unit as short inlet tubes positioned far above the oil column past the midway of the tanks; 5) a sturdy clamp to the oil-outlet tubing 26 emerging from the modular of the MOS unit.

The Scheme of Diversion of a Gas Entrainment into the Ocean Waters—

Following a lengthy holiday to the oil collection, just before and about the elected time of the oil collection to resume on a bright afternoon, the sequence of requisite operations encompassing the MOS unit, are as se forth below—(a) the column within the tank 424 is noted in the 'pilot side tube', and oxygen-free atmospheric air is pumped continuously through an opened (normally clamped) stem of the 'bi-pronged tube', while the out flow through the pipe 40 of the modular unit is clamped immediately distal to the 'sideward outlet tube' 57, whereas the 'sideward outlet tube' with 'one way valves' is kept unclamped. As a warning to workers handling the oxygen-free atmospheric air—Nitrogen predominant atmospheric air with no oxygen is a 'fire-extinguisher', however, if inhaled in a greater proportion it is lethal by diluting the blood's oxygen content without any prior warning symptoms; (b) the oil-outlet tubing 26 of the MOS unit is clamped at this time; (c) once the tanks of the MOS unit are filled with oxygen-free atmospheric air, the air pumping thereafter is stopped and the bi-pronged tubing closed with sturdy clamps, whereby such air flow letting the 'gas entrainment' enter a safe oxygen-free milieu of the tanks, without leading to an explosion; (d) as the oil-collection is initiated, in the event there is a pressured gas entrainment, the elements like Methane being lighter with low molecular weight, they are deemed to enter the gas outlets of the tanks, wherefrom they are let out into the oceanic waters through the 'one way valves' of the 'sideward outlet tube' 57 emerging from the modular gas pipe 40; (e) when the divers note no gas bubbles emerging from the oceanic terminal of the 'sideward outlet tube' 57, as also the oil column in the 'pilot side tube' 66 rises indicating an oil flow, the oil outlet tubing 26 of the MOS unit is unclamped to commence the oil collection (the divers can keep vigilance of the oceanic terminal of the sideward outlet tube from a distance, viewing with binocular goggles); (f) 'the 'two pronged tube' is securely clamped as its function is concluded; (g) even after the oil flow is safely established, the 'sideward outlet tube' 57 of the gas pipe 40 facilitates the pressured gaseous elements to be let out into the oceanic waters on a regular basis, and only a gas-flow below the set-up pressure threshold enters the gas receptacles; (h) if there is a limited 'oil gusher', its 'let out' into the oceanic waters is as discussed below;

Economical merits—the oil company can safely collect the highly utilitarian fuel gas, almost completely through the MOS unit, by planned systematic extraction about the rig site. The aim is not to pursue 100% refining measures of oil gas separation that is otherwise mandated for the 'oil refining plants' engaged in exclusive crude-oil separation (the 'Oil Refineries') by means of a highly involved process of 'Fractional Distillation'.

At this concluding part of the multifaceted targeting of a 'gas entrainment' as was discussed in the foregoing many sections, it can be noted that no stone was left unturned, and no adverse event left out to be addressed, yet with the simplest of measures conceivable. This said, with an awareness, as was afore noted, that the enormity of the nature's wrath can yet surpass all human limitations, as nothing can tackle a gusher or an entrainment that erupts with a sound like hundred trains rushing through the country side, while blowing solid elements into the ocean like lettuce floating in water, as was narrated by an eye witness of a massive well blow out.

A Simpler Alternative in Diverting the Oil-Gusher that Soon Follows the Gas Entrainment A Simpler Alternative can be Elected in Diverting the Oil Gusher that Soon Follows the Gas Entrainment, Obviating the Incorporation of the SLGOE Unit into the Well-Rig Structuring, as Enumerated Below—

(1) After a blow out, when the gas entrainment diverted into the ocean waters through the GDT ceases by all certainty, the off-site trumpets are disconnected and the oil from multiple rubber tubing can be diverted into suitable receptacles. As the oil-gusher slows, the oil then is subject to be collected through one or two lower DTT, the rest being capped. It means an EOS unit is not necessitated in this set up. The anticipated safety in this plan is based on the fact that the oil-gas admixture collected in this occasion is no different from the effluent collected on a regular basis, as the pressured entrainment was incidentally diverted already into the ocean waters and additionally, by flowing through multiple tubing, the volume of the oil is highly fractionated in this instance.

(2) As the need of the MOS unit (which can be simply called as the SLGOE unit in this instance) as a requisite to its unique functioning can be precisely timed, for example, following oil collection after a lengthy holiday, its incorporation into the system and the plan as described in the foregoing can be set forth as an elective event within the rig or immediately adjacent. The needed armamentarium is substantially minimized in this plan. However, initially, the unit can be stationed at a safe distance from the rig, and after cumulative experience about the safety of its operations, can be stationed in the rig or in a place adjacent. It can be the option of the oil company to incorporate the unit for all time gas separation also, if the oil company elects to generate an additional revenue through the rig site gas separation and collection in a regulated manner.

(3) An oil gusher reaching the MOS unit—the oil outlet tube 26 of the MOS unit can be made to pass through an 'oceanic pressure let-out tank' in this context that partly lets out oil under pressure into the ocean waters through massive tube with pressure outlet valves, so as an 'oil gusher' will not flood the rig. Oil collection by extreme capacity receptacles in the sea or the land, is done on an earliest occasion. Similar provisions can be elected to be incorporated into EOS unit also.

The Disposition of a Prototype SLOGE Modular in the Rig Vicinity

The SLOGE modular 32, shown in FIG. 5 can be erected on a single leg, or anchored to the rig by 'units of metal strings' below the surface water 528. In the latter plan, the 'metal strings' are anchored to the leg 54 of the rig in a hemi-hammock like arrangement. Each metal string unit has two strings. Each string is made of sturdy but narrow metal rods or poles 38 (about 2-3 cm in diameter). In each unit, the adjoining metal rods 38 of a string are connected by a 'linkage ring', wherein said ring and the ends of the two adjoining rods 38 are connected to the center of the rod 38 of an adjacent string running parallel in its unit, with no room for redundancy, as shown in FIG. 5. The strings are shown in the drawing with exaggerated dimensions to clarify the structure. The arrangement prevents the strings from sideward bending or sinking, so as to maintain their desired axial length, whereby the modular 32 is precluded from getting closer to the rig. The units of coupled strings are multiple and fan out towards the proposed site of the modular 32, where they intercept with perpendicularly running metal ropes underneath, to make a grid, with atop metal barge 36 resting on the grid. The rods 38 can be many meters long, wherein the originating rod of a string is a direct extension from the leg 54, with no linkage or ring connections, being connected by bolting hard ware. It makes the strings not to bend or sink to the bottom. Underneath, the strings are supported by metal/concrete blocks 42, with locked in air column 48. Three of such rows of concrete blocks 42 are configured, wherein the adjacent blocks are similarly linked like the metal rods, and in turn connected to the metal rods 38. Whereas one row of the concrete blocks 42 lay underneath the area corresponding to the center of the metal barge 36, the other are incorporated about an either end of the barge 36. In the bottom, the central row of concrete blocks are furthermore connected to smaller metal strings 46, the latter similar to the strings about the top, in their structure. The smaller metal strings 46 also originate from the leg 54, and tangentially radiate upwards to connect to the concrete blocks 42, however, with no bending, whereby they keep the concrete blocks in destined position, curtailing their tendency to float to the surface. The entire structuring makes the strings resilient and not break during perturbations of the ocean tides, thereby also precluded from colliding with the rig. Of notable importance is the fact that the air-locking metal/concrete blocks 42 stay under water, and are not exposed to heat in the event of a rig fire.

The FIG. 5 shows a video device 568 of the SLGOE unit 34, adjoining a top window of the tank 404 (however, the tank 424 does not depict the schematic, though it also contains similar provision), and a solar battery power source 526 within the modular, located adjacent to a bullet-proof glass window. The modular 32 structured above the metal barge 36, has desired accessing and protective amenities like—an air tight door (set forth above water), a corridor 402, multiple enveloping burlap coverings 408, 'gas-fire alarm' activated surface fans 420 (on the rig side) and sprinklers 458 (studded about a sparse frame-work of exoskeleton 432), along with a pathway 434 (with ½ foot of water submersion) set forth upon units of metal rods 38, leading to the rig. Powerful jets of water 438 also emanate from the exterior of the modular corridors about the level of the surface waters, to keep away spreading oil/fire on the ocean waters, upon a rig fire. The modular 32 is partially submerged, and as an alternative thereof, can be erected also on a single large submerged air-locking concrete block, the latter also steadied by smaller metal strings 46, as many variations and options are possible in the devised plan that can further simplify the structuring. The most elaborate plan is herein described, where from to choose the most satisfying structuring that suits the needs or personal scrutiny, whereas the inventor's simplified model (FIG. 6) also is herein described. This dispositional plan is applicable to the EOS unit also.

Obviously, the EOS and MOS units can be installed adjacently, if a 'single leg' structuring is planned, or else, they have to be anchored to different legs to evenly distribute the load, only in case it is not an undue strain upon the legs of the rig, especially during adverse oceanic weathers. To be economical, the rig can be structured on three legs, a triangular configuration being as stable as a square or a rectangle, whereby one leg can be spared to the two SLGOE units' stationing. As a common encompassing theme, the single leg and the legs 54 of the rig rising above water are enveloped in many layers of burlap, and studded with sprinklers that are especially forceful about the level of the surface waters 528 (where oil can stagnate), the erected legs being the back bones of the structures they support, and need to be protected from collapsing, in the event the fire lingers upon oil-laden water surface. A sprinkler tube of high caliber-jet also accompanies any tubing not under water in the rig vicinity, said tubing also burlap-covered. The exemplified fans 420 in the FIGS. 5 and 6 can be very large, each wing spanning not less than 5 feet, few inches intervening between the wings of the adjacent fans. The fire/gas alarm is connected to the rig site alarm, to ring and activate the fans and sprinklers about the same time, as the fire will not spread to the modular confines with already activated fans. The corridor space 402 can also serve as an instant destination for fire-fighters jumping into water (the 'water-sealed' basement of a 'Detachable Island Rig', as devised by the Inventor in a contemporary application/patent, serving as a highly safe-guarded instant fire-escape within the rig, for the rest of the crew) or can also be a vigilance/security station, if erected on a single leg, the latter being the safest mode, the single leg being structured with a very broad base about the sea bed. The gas receptacles can also be set forth near the SLGOE units if a single leg is chosen, as the gaseous elements collected are designed to be attenuated.

The Disposition of a Prototype SLOGE Modular with an Anchor Base

In a simpler modification of the foregoing, as shown in conformity thereof in the schematic of FIG. 6 not drawn to scale, a submerged 'anchor' 580 from a rig's 'reinforced leg structure' 582 can serve as the base structure of the modular 32, the anchor's metal frame locking air-columns 543, obviating strain upon the leg 54. The reinforced leg structure 582 can be bolted after the legs are erected in the usual manner. The anchor columns 584 rise in an incline to reach the proposed modular site, and are stabilized by sturdy 'hoisting ropes' 581 of metal that perpendicularly course from the leg 54. The hoisting ropes about the lower levels are substituted by strings of overlapping metal rods 38, as in the foregoing model, spanning from the leg to the anchor columns 584. A submerged air-locking concrete/metal block 579 incorporated into the anchor's terminal and comprising an atop metal barge is designed to conform to a modular base. A submerged pathway 434 from the rig, set forth upon metal blocks 42 with locked in air columns 48 (held in place by hoisting ropes 581), lays underneath the surface water 528. The oil inlet and outlet tubes can optionally travel underwater, along the anchor columns 584, or the ropes 581. The rest of the structures as in the foregoing model directed to the modular, are retained in this model, and not herein repeated, how ever, most of said similar structures are shown in the FIG. 6. Though two anchor columns 584 are depicted in the drawing, there can be three, for better stabilization of the concrete/metal block 579. This simpler model can be a choice when a modular is planned to be set forth not too far from a rig.

The Oil-Separator of the Water Admixed Effluent

When there is breach in the drilling conductor 520 with the effluent flowing into the ocean waters contaminating the ecosystem, there can be an optional 'Oil-Separator Tank of the Water Admixed Effluent' 571 with an on-off mechanism, to minimize such oil flow into the ocean waters. In this option, an 'outflow tubing' 542 having smaller merging tubules at different levels, starts in the bottom space between the drilling conductor 520 and the marine riser 518, and exits above the surface level 528 of the ocean waters (FIG. 2) to reach an 'oil-separator tank' 571 (FIG. 7), also located in the vicinity of the rig, or within the rig. The outflow tubing 542 is deployed into the system only after the drilling conductor 520 was found to be breached following a blow-out. To that effect, normally, the top string (or second from the top) of the conductor 520 is structured with a window that is closed by an air tight 'window closure' 519, such window located completely above water. The window is configured to be sufficiently long, to facilitate the passage of the tubing 542 into the conductor space from outside. It can be easily done, as segmented tubing are articulated to be lengthened down to the bottom of the conductor space (the segments articulated by conjoining T tubes, conforming to a 'sliding screw' arrangement, the latter described in the concluding section of this disclosure) The conductor's widow closure is built to have a complimentary provision to 'incorporate' the tubing 542, said provision normally capped. To start with, the conductor's window closure 519 is opened to pass in the 'outflow tubing' 542, and after the tubing 542 is completely lengthened, it is articulated with the window's closure's complimentary structure, where after the window closure 519 is closed. The tubing 542 operates by siphoning principle that can be switched on. As the window is located optimally above the level of the surface water 528, workers can emergently deploy the tubing 542 with no wait time, working from a boat.

The prototype of an 'oil-separator tank'—as there is a substantial admixture of oil and water about the 'landmark' area of the blown-out well site in this context, the 'oil-separator tank' 571 isolates the oil from flowing into the ocean water to a reasonable extent, while also preventing the ocean water filling the oil-containment, dangerously rising its pressure. Due to relative densities of the two liquid bodies concerned, the water 572 settles to the bottom of the 'oil-separator' tank 571, whereas the oil 573 rises to the top, as the admixed effluent 574 flows from the 'outflow tubing' 542, entering the tank 571 as a sideward 'inlet tube' 575, situated nearer to the top of the tank. On the opposite side, about the middle of the tank, oil 573 leaves the tank through an oil-outlet 576, whereas from the bottom, the water 572 flows back through a water-outlet 579 into the ocean 528. The inflow and outflow are controlled by flow clamps to maintain the fluid level within the tank 571 in such a manner that the inflow from the inlet side tube 575 is not a down-flow, but a tempered sideward merging into the top column, so that there are no undue perturbations in the settled layers of different densities. As the incoming ocean water can be of enormous volume, a separation effectuated in this manner facilitates its return to the ocean with no significant contamination, and oil collected with no significant water admixed. The process can be continued until the rubber sheath 558 (FIG. 2) is deployed outside the conductor, and if it is deferred by the oil company, until the pneumatic sealer (the EPSE or the SSE; U.S. Pat. No. 9,175,549) is stationed within the well bore.

The space between the conductor 520 and the riser 518 can further incorporate a similar 'outflow tubing' 570 starting from the top layers of the fluid column in the opposite side (so as the 'outflow tubing' 570 originates below the level of surface waters 528), wherein the tube 570 joins the tube 542 at any level feasible. This in turn facilitates more of the effluent mixture to be let out than the tubing 542 can singly accomplish. The 'outflow tubing' 570 being short, a small window is equally effective for its deployment. The outflowing water 572 into the ocean can be periodically tested, to be controlled for its hydrocarbon content.

If a leg is elected for the EOS and MOS units, the oil-separator tank 571 can be stationed along with, whereas the rig itself is a better option for a closer monitoring. When a pneumatic sealer is not deployed into a well in an emergent manner, the incorporation of the oil-separator tank (that can be easily and emergently done) is highly significant, to prevent pressure build up in an oil-containment, a brewing recipe for danger that makes any later maneuvers against a pressured effluent, difficult or impossible, resulting in significant contamination of the ecosystem during the wait time for the pressure control. More over, the devised plan of the oil-separator tank 571 is beneficially set forth for an affirmed functioning, being incorporated into the system after a well blow out. It may be noted that the tubing 542 and 570 emerge from the conductor above the water surface, whereas the GDT and the EDT preferably emerge well below the water surface.

THE VIDEO MONITORING OF THE TANKS OF THE SLGOE UNIT—in any model of the SLGOE unit 34, the 'gas separator' tank 404 and the 'oil passage' tank 424 are provided with a video device 568 (FIG. 4, 5, and 6 show the video device, however, exemplified only in the 'gas separator' tank), to monitor the state of affairs within the tanks. The video device is designed to be operable by a solar-powered battery source 526 located inside the modular 32, adjacent to a small bullet-proof glass window. Each tank near its top (about a side away from the oil inlet tube) is structured to have a window fitted with an 'air-tight' bullet-proof glass door. The glass window door opens only to the interior of the tank, with the opening/closing mechanism similar to a conventional 'automated door', wherein an opened door when left ajar, closes automatically after few seconds. As problems can be reasonably expected lower down in the tank, the video device 568 is designed to be positioned with a downward incline about the lens side fore-structure, to facilitate a better picturing of the lower half of the tank. FIG. 4 shows such positioning. The video 568 when needs to document the tank's interior, a projectile structure of the 'video rest' pushes on a 'control button' designed to opening the window door. The video then passes in and pictures the lower half of the tank in a full view. When stopped, the instrument retreats, as the window door closes in few seconds (the devised mechanism facilitates a clear picturing of the tank each time, without the camera lens smeared by the down flowing oil/gaseous elements of the tank). It needs an immediate follow through that an additional video also installed in an optimal position within the modular documents, that the tank's window door is properly shut.

The 'Spiked-Circle' Dispersion Device.

Optimally, the gas-separator tank 404 of the SLGOE has an 'oil dispersion' unit, the latter illustrated in part, in FIG. 3, its extended but minimized view shown in FIG. 1. The oil dispersion unit is made up of—(a) a 'spiked-circle' dispersion device 583 structured as radially connected concentric circles, preferably in steel, (b) a central supporting vertical rod 589 of the circled device 583, the rod fitted to a top structure of the tank 404, and (c) a 'motion control' device (not shown in the illustrating diagrams) of said central supporting rod 589. The 'circled dispersion' device 583 optionally has a lamp-shade like configuration with a minimal incline. The device 583 moves up and down while 'put on' to be operational, as when a block to the down-streaming flow from the tank 404 is noted, or suspected. It can also be operational in continuum at preset intervals, that is, at about 3-5 minute intervals, in effect, conforming to 4-5 axial motions each time, each axial motion including a complete downward and upward movement. The concentric circles 587 of the 'dispersion device' 583 have downward extensions with knife-like cutting edges about the bottom (not shown in the drawing), wherein said cutting edges also have spiked projections 590 in strategic places that correspond to the positional configurations of the bottom perforations 76 of the tank 404. In a downward thrust of the disperser 583, its spikes 590 disrupt the blocks to the bottom perforations 76 of the tank 404, whereas the bottom cutting edges of the concentric circles 587 severe large globs of oil at the bottom of the tank 404, thereby the 'dispersion device' 583 serving a dual purpose. The cross sectional dimensions of the spikes 590 are devised to be similar, but optimally smaller than the perforations 76, as, in the axial downward motion of the device, all the spikes 590 are designed to pass through the perforations 76. In conformity thereof to such function, the bottom extensions of the concentric circles 587 located nearer to the center, are designed to be longer in an elected lamp shade configuration whereby the lower ends of the bottom extensions of all the circles 587 are in a same horizontal plane so that all the spikes 590 can pass through the perforations 76 of the tank 404, in an axial downward motion of the device 583.

In this preferred configuration, the spaces 591 between the concentric circles 587 are wide, and there are only two radially positioned members 592 in equidistance, connecting the circles 587, whereby the semisolid crude of the effluent will not settle on the top surface of the dispersion device 583. It further facilitates an easy ascent of gases that are separated in the bottom level of the tank. The bottom perforations 76 of the tank 404 are devised to be oblong rather than round, such structuring facilitating better passage through, of the semisolid effluent. With the unit as structured, a continuous oil flow down-stream is always ensured. The dispersion device 583 is normally positioned in the bottom level of the tank 404, just above its oil column, so that the movement of the device 583 as well as the time needed of such movement to reach the sieved bottom of the tank 404, are brief. The 'control device' for the up-and-down motion of the central supporting rod 589 of the dispersion device 583, is positioned outside about the top of the tank 404 (but within the shell of a modular), whereby the axial motion of the rod 589 conforms to external control outside of the tank 404.

The Modular Protective Enclosure of the SLGOE Unit

In view of the utmost functional importance of the SLGOE unit, it is deemed prudent that the whole unit is designed to be secured in an enclosed protective structure, herein actuated by structuring the unit in a shell of 'modular capsule', the latter provided in pre-configured sizes. With all the inlets and outlets capped, the modular 32 is deployed in its destined 'reception site' atop the metal board 36 (FIG. 5), or else, atop the submerged air-locking concrete/metal block 579 (FIG. 6) about the vicinity of the rig. As the needed stepwise incline of the tank 404 and of the tank 424 is configured within the modular capsule, the base of the modular itself can conform to a horizontal structuring, for its easy and secure stationing atop its base structure. The compatibility of the unit is configured by the number and size of the tubing to be so incorporated, while such objectives may be conventionally standardized.

The 'modular' is structured with retractile wheels (hooded caster wheels) to its bottom, for its precise stationing. As earlier described, a video monitoring device is incorporated into the modular 32 also, in addition to its incorporation about the tanks. The modular unit 32 is equipped with conventional 'hooked' and 'ringed' structures, strategically placed about its outer shell, and detachable fixtures for bottom cementing at strategic places, needed of its secure stationing upon its base structure. Such detachable yet strong stationing allows a replacement of the unit, when needed. The modular resists perturbations of the oceanic weathers, by virtue of its barge-like base structuring resisting any upheavals, to stay in an upright positioning. Due also to resilience of its disposition by the anchoring units of linearly set metal strings, breaking from or colliding with a leg of the rig, is precluded. Additionally, most of the appending and anchoring structures of the modular being air-capsuled, the overall strain of the imposed weight upon a leg, even in the event of the oceanic upheaval, is minimized. A future cumulative experience will shed light upon the merits of the foregoing dispositions of the modular, if they are nearly comparable to its disposition upon a single leg, the latter undoubtedly secure. Other details are specified in the section 'The multi-operational SLGOE (MOS) unit'. Threading in entirety of the unit's tubing system, is as described in the concluding section of this disclosure. The tanks of the unit as configured, can be set forth fairly close to each other, so that the modular unit as a whole would be less space occupying.

IN THE CASE OF A DETACHABLE ISLAND RIG (DIR)—reference was/is made to the contemporary application Ser. No. 15/731,327 filed about the same time by the Inventor. In the case of a DIR, the FIGS. 2, 5 and 6 are to be read into, without an 'air gap' shown in these drawings, as essentially rest of the matter is applicable in a similar manner. A window closure 519 (FIG. 2) described in the section of the 'Oil Separator Tank of the Water Admixed Effluent' though normally immersed in water in the setting of the DIR, being air-tight, it is not detrimental, as also the riser and conductor spaces are already flooded in this context.

THE VULCANIZED RUBBER AS THE STRUCTURAL CONSTITUENT—it can be noted that all the rubber washers or any assembly devices of rubber, incorporated in the oil gas separator unit, in the riser and the conductor, and in the modular unit, are made of vulcanized rubber, the only type that can resist the degrading attack of the petroleum analogs.

The Ultimate Merit of the Invention

The proposed models as a whole, by any standard encompass simpler methods to divert a pressured gas entrainment into a room of oceanic containment, wherein the pressure is dissipated in its entirety. What needs to be implemented is only a small step forwards in 'means' familiar (such 'means' being the flow principles based on the Pascal's law), however, with a 'giant leap' thereof in the remedial functions achievable. It is to say, that the disclosure is the simplest, yet the 'ultimate' in preventing a gas entrainment culminating into a rig-fire, as also being a safe, perfect, and unfailing solution that eluded for decades thus far. More complex a measure is, more prone it is for failure, as was exemplified by the 'Deep Water Horizon' rig-fire, wherein the failure involving the BOP was never identified with certainty. An enormous simplicity was destined to become an accurate problem solving formula, as was also destined to be enormously 'time taking' in its circuitous derivation, at last overcoming multiple stumbling blocks along the way.

The Instant Joint Configurations and Closing Caps

The invention further envisions a model of tubing, and the methods of instant system joining or closing, for all future units, or as a replacement-tubing for the existing units. Said tubing is structured to have a deep threaded configuration on the inside traversing the entire lengths. Inner threading is better (though manufacturing is more involved), as an outer threading can collect sediment and lose its precision. The threading of the tubing, small or lengthy, can involve the well and its vicinity, the rig, and finally the appended tubing structures of costly equipment, facilitating instant joining or closing of a compromised or broken structure, aided by means of—

1) 'Instant joint-structures'—these are devised to be shaped as I, T, J, L, C, U, Y etc. with similar inner threading as the tubing itself, to be inserted for system joining, when a conduit line is broken. The working of the 'joint-structures' conforms to a 'sliding screw', aided by two or more 'conjoining' I shaped tubing with complimentary threading on the opposite side. The 'conjoining' I tubing have their threaded outer diameter smaller than the threaded inner diameter of the involved tubing system and the devised 'joint configurations'. When a conjoining I tubing alone is suffice, it is inserted all by itself, as a sliding screw. Most of the times, the I tubing alone can be suitable, and all by themselves sufficient. The conjoining I tubing is made sufficiently long, and the central part colored red, as the visible red central part ensures that the I tubing is screwed-in equally and sufficiently long, on either side. The tubing system has its caliber size engraved in equidistance, so that the compatible instant joint structures and the I tubing can be chosen from the tool box. The functionally uninvolved middle part of the 'joint-structure' is enlarged externally for handling, even by robotic maneuvers.

2) 'Closing caps'—they have complimentary threading to their stems (having a smaller dimension and outer threading, wherein the tubular system has an inner threading), for closing a system, when system joining is of no option. The functionally uninvolved external part of the stem terminal enlarges to double the size or more, ending in a sturdy and massive closing cap, to resist enormous pressure at times exerted by the tubular system at the terminal, and the massive cap with similarly sized distal stem is amenable to robotic maneuvers. Simple closing caps with complimentary threading are used to temporarily seal one end of a severed tubing while the other severed end is worked on.

How to find the source of gas/oil leak and mending it—about the oil-tubing of the rig confines and outside, oil/gas sensing 'equipment' are placed at equidistance, each numbered, defining its territory. When a leak occurs following a tubular damage, its territorial equipment rings its alarm first, though other alarms ring later, as the leak spreads. The devised computer soft-ware notes the timing, however, the one that first rang, is the source (unless the leaks are multiple). The leak is confirmed by the adjacent alarms that rang immediately following. The computer sets forth the chronology, for an instant information. The security crew familiar with all the numbered territories, should deploy emergently the instant joint structures. The production tubing within the well has its own pneumatic plugging device, the 'Emergency Plugging Oil Conduit' (EPOC), disclosed in the original application (U.S. Pat. No. 9,175,549), deployed after a well blow-out with total wipe-out of well-head structures (to be better done when the oil-leak is a mere spill). As the 'joint structures' are fixed in dimensions, the length of the tubing to be severed should be properly configured. On the other hand, as the minimal length of a damaged tubing to be severed cannot be minimized any more, the number of the joint structures (with two or more 'conjoining' I tubes) are to be properly configured before severing the tube. The I configurations are structured as both 'joint-structures' and 'conjoining tubes', the former with similar threading and the latter with complimentary threading. The leak is insulated first, and the tubing including the I tubes to be inserted are articulated outside, and then the damaged tubing is cut, for the articulated set to be inserted. One cut end is temporarily closed by a simple closing cap, while the other is worked on. The final manipulations of the conjoining I tubing are done in-situ, to establish a conduit line, with vulcanized rubber washers also for a fluid-tight closures. It is obvious that the distorted tubing may need an intervening U/C joint, and a bent L-shaped curve needs an L-joint, whereas a complex interconnection needs a T-joint. The crew must have a mock practice of possible maneuvers. The joint-configurations' can conform to two designs—'subtle' or 'striking' ('Sub' or 'Stri'). In the 'subtle' configurations the devised curves are less obvious.

Unceasing oil/gas emission from a source that cannot be detected/mended can be a cause of an unceasing fire, or else for an uncontainable pollution of the eco-system. Hence, the foregoing structural mandates are as important as all the other security measures put together. Moreover, what needs to be herein implemented is only an extension of means familiar, however, with remedial functions not otherwise achievable in the most precarious of times.

It is a modern day irony that a gas fueled rig-fire is an unresolved concern amidst ocean size of water. Let a giant gas entrainment be dwarfed in a room of oceanic containment.

The invention claimed is:

1. An invention directed to an off-shore petroleum oil well, comprising an exemplary prototype device for 'Subsea Level Diversion of a Gas Entrainment' working in conjunction with a device of 'Sea Level Gas Separator of Oil Well Effluent' (SLGOE) unit, wherein said devising of the subsea diversion of a gas entrainment precluding the gas entrainment entering a rig upon failure of a Blow out preventer (BOP), the encompassing means and methods of said oceanic diversion as set forth below—

(a) a bottom string of a 'marine riser' and a bottom string of a 'drilling conductor', close to a well head, are set forth to incorporating large horizontally dispositioned 'Gas Entrainment Diversion Tubing' (GDT) originating from the riser pipe and emerging from the conductor string, said GDT devised to be two or more in circumferential equidistance, wherein each GDT forks into a down turned terminal (DTT) opening into the ocean waters, and an up going Effluent Diversion Tubing (EDT) to be reaching an Emergency operational SLGOE unit' (the EOS unit), said EDT being normally closed by a sturdy clamp and opened at the conclusion of the GDT functioning, (b) said down-turned ocean terminal (DTT) comprising one way valves divert a gas entrainment into ocean waters from the riser pipe, whereas closure of an air-tight high security rig site closure sealing the riser-conductor from the rig, (c) the down-turned terminal (DTT) precluding the pressure of a true vertical height (TVH) of the ocean waters exerting upon the one way valves, as also the ocean terminal not subject to full effects of the 'hydrostatic pressure' of an open body of ocean water, as in accordance with Pascal's law, (d) (i) the GDT being additionally set forth about the midway of the riser-conductor, as also about the top strings, comprising at least 6 in number to greatly subdue the gas entrainment reaching the rig site, whereas lengthy risers can be elected to comprising further additions of GDT, (e) though a giant gas entrainment from the GDT emerging to the surface waters is neither 'pressured' (as per the Pascal's law) nor 'explosive', as a cautionary measure, it is precluded from rising to a surface 'air-gap' as follows: (i) as drilling a down hole is reaching a completion and amenable for a 'kick' from an oil containment, a threaded stem of a large metal trumpet (the 'well site' trumpet) is devised to articulate with each of the down turned terminal (DTT), the trumpet's flat bottom comprising 4-5 rubber tubing traversing radially to diverse destinations 50-70 meters afar; (ii) each rubber tubing in turn terminating as a wide metal trumpet ('off-site' trumpet) having a flat down-facing bottom steadied to the ocean floor, few short diverging metal tubing from the bottom emitting the divided gas entrainment into the ocean waters; (iii) said devising 'distancing' the emerging gas entrainment from the 'air-gap' and the rig confines, (f) the GDT functioning in 'oceanic diversion' of the gas entrainment in instances as set forth below: (i) wherein drilling a down-hole is reaching a completion and subject to a 'kick' from an oil containment; (ii) upon a well blow-out following a down-hole penetration, (g) upon cessation of the gas entrainment, the 'well site' trumpets are disarticulated and the DTT capped by robotic arms, precluding oceanic contamination with an 'oil gusher' that may follow, the encompassing means and methods as set forth below: (i) at least one of the tubing terminating into an 'off-site' trumpet is subject to carrying along with it a 'water sampling tube' (normally closed by a sturdy closure about the rig terminal), wherefrom the ocean waters are periodically sampled; (ii) upon the water sampling showing the presence of oil effluent (as also the emerging gas bubbles about the 'off site' trumpet tubing seeming none by recordation of a night-vision vodeo set forth about the ocean floor), the 'well site' trumpets are disarticulated and all the DTT capped, the cap about the DTT being affixed by a lengthy chain about the top of the cap head; (iii) soon after, the EDT is unclamped for an oil flow into the EOS unit, however, the incidental diverting of an 'oil gusher' into the oceanic waters minimizing the pressure of the gusher, as also the part of the gusher possibly reaching the rig being minimized, (h) an alternate means of oil collection from an incessant oil gusher upon cessation of the gas entrainment comprises disconnecting the off site trumpets and connecting the 24-30 of the emerging rubber tubing to oil receptacles, (i) (1) a down-hole, a well head and midway oil-gas sensing alarms about the well, set forth before down-hole penetration serving as a warning to the crew, for the closure of said air-tight high security rig site closure, sealing the riser-conductor from the rig; (2) the GDT optionally set forth with sturdy 'GDT closures' within the riser pipe, the closures opening upon ringing of any of the well site alarms, (j) few of the riser strings and few of the conductor strings are manufactured incorporating the GDT, whereas a conjoining of the GDT of the riser and the conductor by a sturdy 'sliding screw' is done within the conductor space upon the riser deployment, said conjoining tubing comprising a segment of rubber tubing allowing possible imprecision, and (k) the SLGOE unit comprising two discrete functional models such as—(i) Emergency Operational SLGOE unit' (EOS unit) and (ii) Multi Operational SLGOE unit (MOS unit).

2. The 'Sea Level Gas Separator of Oil well Effluent' (SLGOE) unit of claim 1, wherein the devising of the flow principle of the SLGOE unit and devising of its two discrete functional models are as set forth below—

(a) the SLGOE unit about the surface of the ocean waters comprising a 'gas separator' tank and an 'oil passage' tank, the gas separator tank positioned at a higher level within an unit of 'modular capsule', facilitating an effluent flow to the lower level oil passage tank, (b) from the well source, the effluent with admixed gases terminating into a top 'effluent inlet tubing' of the gas separator tank, 'down-flows' to the bottom, (c) the gaseous elements instantly separating from the down-flowing effluent are subject to be collecting about the top of the tank, the encountered inflammable gases having low molecular weight, (d) the gas separator tank has wide 'gas outlet tubes' clustered all about the top, whereby an exceeding volume of the gas outlet tubes dissipating an exceeding pressure of the out flowing gas, the gas outlet tubes merging into a common out going 'gas pipe' of the SLGOE modular unit, (e) the gas separator tank comprising a model of spiked-circle 'oil-dispersion device' subject to disrupting the outflowing semisolid effluent entering bottom perforations of the tank, (f) the effluent from the gas separator tank enters the oil passage tank about the top, to be down flowing to the bottom, the oil passage tank having wide gas-outlet-tubes clustered all about the top, the gas outlet tubes merging into the common out going gas pipe of the SLGOE modular, (g) the oil passage tank having a 'siphoning' tube emerging from the SLGOE modular, to be joining the 'oil-collection' system, said oil collection means having intervening 'oceanic pressure let-out tank' with one way valves, letting out pressured liquid effluent into ocean waters before flowing to the oil collection system, (h) the tanks of the SLGOE unit monitored by solar powered video devices, (i) the SLGOE unit is incorporated into the well-rig system as two discrete functional models positioned in the rig vicinity, to be functioning as: (i) an Emergency Operational SLGOE unit (the EOS unit) wherein the EOS unit connected to the well's riser pipe via the GDT, is operational upon a well-blow out, separating the admixed oil-gas effluent, following the oceanic diversion of the 'gas-entrainment' by the GDT; (ii) a Multi-Operational SLGOE unit (the MOS unit) wherein the MOS unit being operational at all times following incorporation of a 'production tubing', to be separating admixed oil-gas effluent and additionally diverting pressured gaseous elements into oceanic waters, (j) wherein there is a breach to the well's drilling conductor with at least partial cessation of flows into EOS unit, the scheme of effluent diversion further including a device of 'Oil-Separator Tank of the Water-admixed Effluent', and (k) the SLGOE unit is structured as a 'SLGOE modular unit' capsule of preconfigured sizes.

3. The prototype SLGOE unit of claim 2 (k), wherein the unit is configured to be structured as a 'SLGOE modular unit' capsule, said modular capsule made of provisions as set forth below—

(a) the modular capsule with its inlet and outlet tubing temporarily capped, is deployed about the oceanic surface of the rig vicinity, a barge-like base structuring of the modular resisting perturbations of the oceanic weathers, to be staying in upright positioning, (b) the compatibility of the modular unit configured by standardized number and size of the incorporated inlet and outlet tubing, (c) the modular is set forth to be erected on a single leg, or anchored to a leg of the rig by units of metal strings below the surface water, each metal string made of overlapping metal rods to prevent sideward bending or sinking of the strings, whereby the strings maintain desired axial length, (d) said units of strings in a hemi-hammock like arrangement fan towards the modular, wherein intercepting metal ropes underneath make a grid with an atop metal barge stationing the modular, (e) the strings and the modular are furthermore supported by bottom rows of submerged metal/concrete blocks with locked-in air columns, said metal/concrete blocks in turn steadied by bottom metal strings tangentially radiating upwards from the leg of the rig, the tangential strings countering the metal/concrete blocks from floating to the surface, (f) as an alternative thereof, a submerged 'anchor' serving as a base support to the modular, wherein: (i) the anchor is affixed to the rig's reinforced leg structure, the anchor's air-locking metal columns obviating strain upon the leg; (ii) the anchor-columns rise in an incline to support a modular platform comprising an air-locking metal block with an atop metal barge; (iii) the anchor columns are subject to be stabilized by 'hoisting metal ropes' perpendicularly/horizontally coursing from the leg, the lower of the 'hoisting ropes' substituted by units of metal strings, each metal string made of overlapping metal rods preventing buckling or sideward bending of the strings; (iv) upon a row of submerged air-locking metal blocks stabilized by bottom 'hoisting ropes', lays a submerged path way to the rig, and (g) the SLGOE modular unit additionally comprising—(i) corridors with door access; (ii) fire-safe devices of: enveloping burlaps; water-jetting corridors; alarm activated high-powered sprinklers and wind-blowing fans about a frame of scant exoskeleton; and (iii) a water-sealed pathway to the rig upon units of metal strings or 'hoisting ropes'.

4. The 'Sea Level Gas Separator of Oil Well Effluent' (SLGOE) unit of claim 2, wherein incorporated into the 'gas separator' tank of the SLGOE model is an 'oil dispersion' unit exemplified as a 'spiked circle' design made of steel, said 'oil dispersion' unit having structuring as set forth below—

(a) the 'oil dispersion' unit comprising: (i) a dispersion device of radially connected concentric circles; (ii) a centrally positioned vertical rod supporting the dispersion device, said supporting rod fitted to a top structure of the gas separator tank, and (iii) a top 'motion control' device set forth outside the tank, facilitating axial motion of the supporting rod, (b) the 'oil dispersion' device elected to be having a lamp shade configuration with a minimal incline, the concentric circles of the dispersion device being connected by two radially positioned members in equidistance, (c) the dispersion device having axial motion, wherein about a downward motion, the bottom cutting edges of the concentric circles severing the solid/semisolid effluent about the bottom of the tank, (d) the concentric circles of the 'dispersion device' having strategically positioned 'spiked' projections corresponding to the tank's bottom perforations, whereby all the spikes pass through the bottom perforations of the tank in an axial downward motion, to disrupt the blocks about the bottom perforations, and (e) the axial motion of the supporting rod of the dispersion device conforms to external controls structured outside the tank, however protected inside the modular enclosure.

5. The SLGOE unit with a prototype set forth as an Emergency Operational SLGOE unit (an EOS unit) within the rig's vicinity as in claim 2 (i), wherein the EOS unit preclude the oceanic pollution by an oil gusher that may follow a gas entrainment upon a well blow out, a devised functionality of the EOS unit is as set forth below—

(a) (i) the EOS unit is incorporated into the oil/gas collection system about the time the down-hole drilling is reaching its completion and is amenable for a kick; (ii) an effluent diversion tubing (EDT) of the EOS unit starts as an up going bifurcation from the GDT, the EDT normally closed by a sturdy clamp at its origin, to be opened by robotic arms at the conclusion of the GDT functioning of oceanic diversion of a gas entrainment, (b) (i) the predominant liquid effluent is directed to the unclamped effluent diversion tubing (EDT) to reach the EOS unit, while the DTT were capped by robotic arms; (ii) about the gas separator tank and the oil passage tank of the EOS unit, by the effluent down flow from the top, a gaseous separation is achieved, the low molecular weight effluent gases rising to the top outlets; (iii) by voluminous gaseous outlets about the top of the tanks the pressured gaseous elements greatly attenuated, (c) consequent to a mild or moderate damage upon a blow-out, with a disruption to the production tubing with or without damage to the marine riser, while a rig level closure sealing the riser-conductor, the events comprising: (i) the pressured gas entrainment is let out from the GDT into the oceanic waters as also flowing through the production tubing to enter the MOS unit; (ii) when the pressured gaseous entrainment is no more flowing into the GDT, an attenuated admixed effluent is diverted into the EDT (to reach the EOS unit); (iii) wherein the rig level closure is not sealing the riser-conductor, the foregoing events are less facilitated, (d) wherein a severe damage is subject to additionally disrupting the drilling conductor: (i) the riser and the conductor communicate with the ocean water ceasing the flows through the production tubing and the EDT (the latter entering the EOS unit above the surface water) as also the pressure and the fluid level within the riser-conductor equalize with ocean waters; (ii) the gas entrainment to a larger extent is forced out through the GDT into the oceanic waters as also escaping through the structural breaches; (iii) some flows through the production tubing may continue, the set forth mechanical forces being still partially operable, (e) separated oil of the EOS unit reaches the rig, transiting through an 'oceanic pressure let-out tank', whereby an 'oil gusher' is let out into ocean waters through a massive pipe with one way valves while oil is soon collected by extreme capacity ocean-lane receptacles, (f) the multiple effluent diversion tubing (EDT) emerging from the riser are set forth to be converging into one or two, before entering into the EOS unit.

6. The Multi Operational SLGOE unit (a MOS unit) within the rig vicinity as in claim 2 (i), wherein a functionally-oriented structuring of the unit is as set forth below—

(a) the MOS unit upon installation of a production tubing, receives the effluent from the intact/breached production tubing said effluent initially by-passing the rig, wherein a blow out with incorporated production tubing comprising 'anticipated timing' as after gas collection following a 'lengthy holiday', (b) the MOS unit is set forth to receiving the well effluent at all times to separate its gaseous elements, a 'lengthy holiday' to oil collection subject to setting forth an event of the pressured gaseous elements reaching the oil collection system, wherein with damage involving the production tubing: (i) the gaseous elements let out into the GDT, the GDT closures opened and the DTT uncapped at this time; (ii) a fraction finds its way through the production tubing to the MOS unit for a 'planned oceanic diversion' of its gaseous components, the liquid components returning to the rig, (c) separated oil of the MOS unit returning to the rig, is devised to transiting through an 'oceanic pressure let-out tank', whereby an 'oil gusher' is briefly let into ocean waters through a massive pipe with one way valves of set forth pressure threshold, (d) for aceanic diversion of moderately pressured gaseous elements upon a lengthy holiday to oil collection, the MOS unit having additional structural features as set forth below: (i) the common gas pipe of the MOS unit emerging from the modular unit comprising a large 'sideward outlet tube' with 'one way valves' of set forth pressure threshold, said outlet tube letting out the pressured gaseous elements into the ocean waters at moderate depth; (ii) a 'clamp' set forth about the common gas pipe of the modular, immediately distal to said 'sideward outlet tube'; (iii) a L-shaped 'pilot side tube' about the bottom of the 'oil passage' tank, the horizontal limb of the L-tube let out through the modular unit and comprising a vertical limb with a bullet-proof glass window is subject to showing column features of the 'oil passage' tank; (iv) a 'bi-pronged tube' with the devised forging prongs entering either tank of the MOS unit above the oil column past the midway of the tanks; (v) a sturdy clamp to the oil-outlet tubing emerging from the 'oil passage tank' of the MOS unit, (e) the scheme of diverting pressured gaseous elements into the oceanic waters by the MOS unit, is as set forth below: (i) preceding the oil collection, the column length within the 'oil passage' tank is noted about the pilot side tube; (ii) the clamp of the common gas pipe of the modular unit is clamped, as also the MOS unit's oil outlet tubing reaching the rig is being clamped, while the oceanic 'sideward outlet tube' is kept open; (iii) oxygen free atmospheric air is being pumped through an opened (normally clamped) stem of the 'bi-pronged tube' unit both the tanks of the MOS unit are filled; (iv) said oxygen free atmospheric air flow into the tanks of the MOS unit is set forth to letting the pressured gas flow enter an oxygen-free 'milieu' of the tanks, precluding an explosive fire; (v) the pressured gaseous elements entering the tanks are let out into the oceanic waters through the 'sideward outlet tube', until divers note no (more) gas bubbles emerging from the oceanic outlet, as also the oil column is subject to rising in the 'pilot side tube' indicating an oil flow; (vi) upon the oil flow, the 'siphoning' of the MOS unit's oil outlet tubing is initiated, commencing oil collection; (vii) the stem of the 'two pronged tube' is then subject to be securely clamped; (viii) the, 'sideward outlet tube' of the gas pipe lets out the effluent gas of higher pressure threshold into the ocean waters as a routine, letting the rest to be reaching the gas receptacles in the MOS unit is incorporated into the oil collection system as a routine for a bimodal function, whereas its incorporation into the system can be elected as also occasional, to let only a pressured effluent.

7. Consequent to severe damage upon a well blow-out with disruption to the drilling conductor as in claim 2 (i), wherein the riser-conductor communicate with the ocean water with cessation of the EOS unit function, the remedial measures are as set forth below—

(a) a top edge hard-ware of a strong rubber sheath is set forth to be articulated with and cemented to a complimentary hardware located all around the drilling conductor about different strategic levels, wherein the chosen level of the conductor hardware is deemed to surpass the highest breach to the conductor, (b) a bottom edge hardware of the rubber sheath surpassing the largest diameter of disruption (DOD) about the ocean grounds, is cemented to the oceanic floor, while the liquid column within the conductor and the riser is being suctioned out from the rig level, (c) the well bore below a lowest breach, is subject to be temporarily sealed with a 'pneumatic sealer', followed by a permanent structuring of a 'NEW INNERMOST REPARATIVE CASING', to seal all the leaks including those from distant ocean craters, (d) wherein there is damage to the riser and the drilling conductor, identifying the highest level of the imperceptible breaches comprising: (i) installing under-water 'night-vision' video devices under bright illumination about a level wherein the breaches are imperceptible; (ii) instilling a liquid pastel color from the rig into the fluid column between the riser and the conductor, as the video devices detect the highest level where the color seeps through the exterior of the conductor and interior of the riser; (iii) a brighter color is used at a later time to find as yet unconfirmed breaches; (iv) sonar flow-detection devices are optional as also confirmatory, (e) (i) the breaches of the conductor are set forth to be cemented from outside upon a scaffold of metal sheath covered with cement-impregnated metal mesh, wherein a wide border of the mesh overlays the metal sheath and the surrounding un-breached areas of the conductor, the mesh furthermore having layering of cement, hydraulic water stop cement (Quikrette, number 1126) being suitable for said reparative cementing; (ii) a high reliability riser being paramount to the well and BOP functioning, the damaged riser strings are being replacement, and (f) a devising of 'oil separator tank of the water-admixed effluent' is further subject to isolating the oil from flowing into the oceanic waters, as also preventing the ocean waters entering the oil containment, to otherwise rising its pressure to be turning into a spewing geyser.

8. wherein there is a breach in the well's drilling conductor, the remedial measures by the device of 'oil-separator tank of the water-admixed effluent' as in claim 6 (f), are subject to having means and methods as set forth below—

(a) (i) said oil-separator tank being amenable for emergency functioning with no wait time; (ii) an 'outflow tubing' is deployed to pass through a built-in air tight 'window closure' of the conductor above the oceanic surface, said outflow tubing with 'merging tubules' throughout being devised to reaching the bottom of the conductor space; (iii) said window closure is set forth with an articulation provision for the 'outflow tubing', said articulation provision normally capped and structured to be air-tight, (b) the water admixed effluent from the outflow tubing enters the devised 'oil-separator tank' as a sideward 'inlet tube' near the top, wherein subject to relative densities of the two liquid bodies concerned, the water settles about the bottom of the oil-separator tank while the oil rises to the top, (c) in the oil-separator tank: (i) about midway in a side opposite the effluent inflow, the oil leaves through an oil 'outlet tube'; (ii) from a bottom tubing the water flows back to the ocean; (iii) the flow from the side inlet tube is controlled to be not down-flowing into the tank, but a tempered sideward merging into the top column, preventing undue perturbations about the settled layers of differing densities, (d) (i) an additional smaller outflow tubing with a smaller window closure is set forth about the opposite side of the conductor; (ii) the smaller outflow tubing originates about the top space of the conductor below the level of the surface waters, its window closure set forth above the level of the surface waters; (iii) the smaller outflow tubing joins the larger outflow tubing at any level feasible, (e) the outflow of the oil-separator tank into the oceanic waters is periodically tested, and controlled for its hydrocarbon content, and (f) wherein a leg is devised for stationing the EOS and MOS units, the oil-separator tank can be stationed along with, whereas for a closer monitoring the rig itself being a better placement site.

9. The invention directed to 'Subsea level oceanic diversion of a Gas Entrainment' as in claim 1, wherein as a simpler plan of diverting the oil gusher that soon follows the gas entrainment, the following schematic is elected—

(a) when the oceanic diversion of the gas entrainment through the GDT ceases by all certainty, the off-site trumpets are disconnected while the oil flow from the rubber tubing of the well-site trumpet are diverted into suitable receptacles; (ii) as the oil-gusher slows, the oil is collected through one or two lower GDT, the rest being capped, the admixed gas in this instance being not in concerning proportion, (b) the foregoing plan implying that the EOS unit is not necessitated in this set up to be incorporated into the rig-oil well system, simplifying the needed armamentarium, (c) the oil gusher from the MOS unit is transitioned through an 'oceanic pressure let-out tank' to partly letting out oil under pressure into the ocean waters through pressure outlet valves, while extreme capacity ocean-land receptacles are soon incorporated.

\* \* \* \* \*

UNITED STATES PATENT AND TRADEMARK OFFICE
CERTIFICATE OF CORRECTION

| | |
|---|---|
| PATENT NO. | : 10,871,055 B2 |
| APPLICATION NO. | : 15/932078 |
| DATED | : December 22, 2020 |
| INVENTOR(S) | : Sumathi Paturu |

It is certified that error appears in the above-identified patent and that said Letters Patent is hereby corrected as shown below:

On the Title Page

Item (73) please correct Assignee name to read:
Sumathi Paturu

Signed and Sealed this
Eighth Day of October, 2024

Katherine Kelly Vidal
*Director of the United States Patent and Trademark Office*